United States Patent
Campos et al.

(10) Patent No.: US 7,694,253 B2
(45) Date of Patent: Apr. 6, 2010

(54) AUTOMATICALLY GENERATING AN INPUT SEQUENCE FOR A CIRCUIT DESIGN USING MUTANT-BASED VERIFICATION

(75) Inventors: Jorge Campos, Sacramento, CA (US); Hussain Al-Asaad, Sacramento, CA (US)

(73) Assignee: The Regents of the University of California, Oakland, CA (US)

( * ) Notice: Subject to any disclaimer, the term of this patent is extended or adjusted under 35 U.S.C. 154(b) by 146 days.

(21) Appl. No.: 11/805,902

(22) Filed: May 24, 2007

(65) Prior Publication Data

US 2007/0294655 A1   Dec. 20, 2007

Related U.S. Application Data

(60) Provisional application No. 60/808,006, filed on May 24, 2006, provisional application No. 60/849,717, filed on Oct. 4, 2006, provisional application No. 60/860,886, filed on Nov. 22, 2006.

(51) Int. Cl.
*G06F 17/50*   (2006.01)
*G06F 9/45*    (2006.01)

(52) U.S. Cl. .................................................. 716/5
(58) Field of Classification Search .................. None
See application file for complete search history.

(56) References Cited

U.S. PATENT DOCUMENTS 6,298,317 B1 * 10/2001 Wiemann .................... 703/22

OTHER PUBLICATIONS

DeMillo, "Hints on Test Data Selection: Help for the Practicing Programmer," Computer, 1978 IEEE, pp. 34-41.*

(Continued)

*Primary Examiner*—Leigh Marie Garbowski
(74) *Attorney, Agent, or Firm*—Park, Vaughan & Fleming LLP; Mark Spiller

(57) ABSTRACT

One embodiment of the present invention provides a system that automatically generates an input sequence for a circuit design using mutant-based verification. During operation, the system receives a description of the circuit design. Next, the system determines a target value for a control signal in the description and a mutant value for the control signal. The system then determines if an input sequence exists for the circuit design that stimulates the control signal to the target value and causes the effects of the target value and the effects of the mutant value to reach an observation point in the circuit such that the effects of the target value and the effects of the mutant value differ at the observation point. If such an input sequence exists, the system then simulates operation of the circuit design using the input sequence. During simulation, the system generates two sets of signal outputs for the circuit design. The first set of signal outputs is affected by the target value for the control signal, while the second set of signal outputs is affected by the mutant value for the control signal.

17 Claims, 25 Drawing Sheets

OTHER PUBLICATIONS

Woodward et al., "From Weak to Strong, Dead or Alive? An Analysis of Some Mutation Testing Issues," 1988 IEEE, pp. 152-158.*

Campos et al., "Concurrent Design Error Simulation for High-Level Microprocessor Implementations," 2004 IEEE AUTOTESTCON, pp. 382-388.*

Campos et al., "Mutation-Based Validation of High-Level Microprocessor Implementations," 2004 IEEE, pp. 81-86.*

Campos et al., "MVP: A Mutation-Based Validation Paradigm," 10th IEEE Int'l High-Level Design Validation and Test Workshop, Nov. 30-Dec. 2, 2005, pp. 27-34.*

* cited by examiner

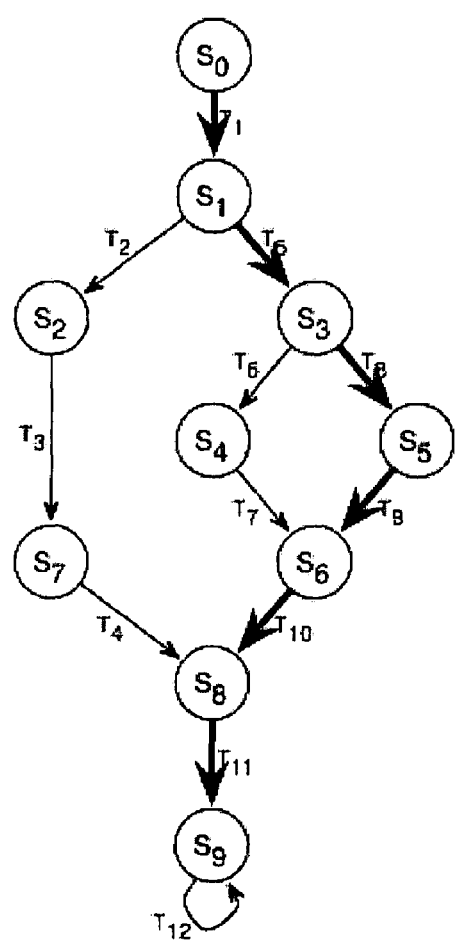 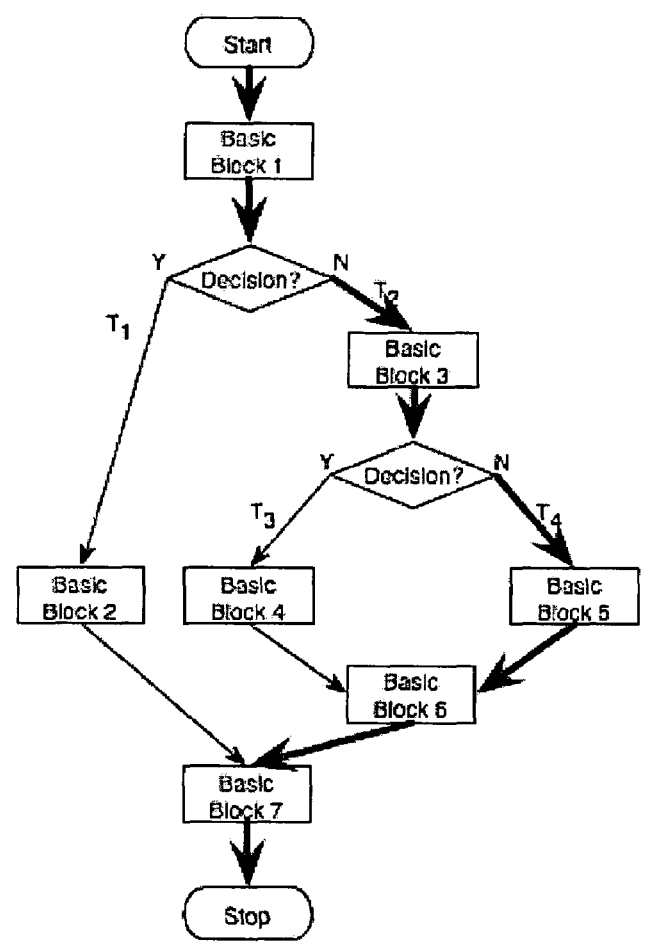
FIG. 3A                    FIG. 3B

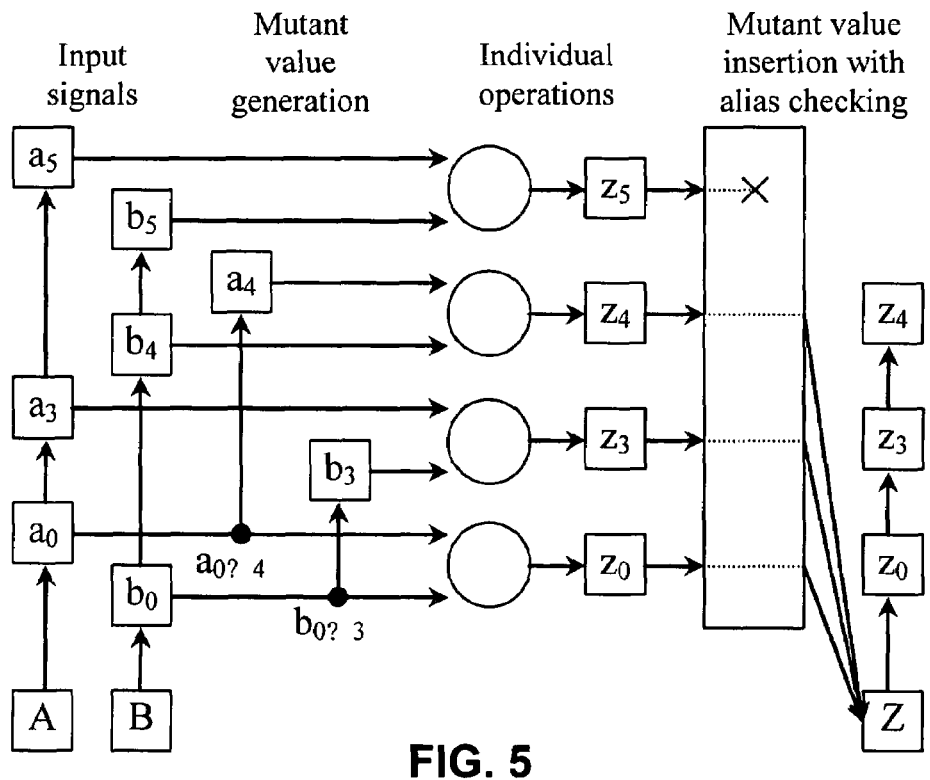

FIG. 5

| Initial Values: | $A = \{A_0=2, A_1=7\}$  $B = \{B_0=4, B_2=5\}$   $Z = \{Z_0=6, Z_3=3\}$ |
|---|---|
| VHDL Condition Statement | Corresponding actions required for concurrent error simulation |
| IF (A<B) | STEP i:   $C = A<B = \{C_0=T, C_1=F, C_2=T\} = \{C_0=T, C_1=F\}$ |
|  | STEP ii:  A.T <= $\{A\_T_0=2\}$, A.F <= $\{A\_F_0=2, A\_F_1=7\}$ |
|  |              B.T <= $\{B\_T_0=4, B\_T_2=5\}$, B.F <= $\{B\_F_0=4\}$ |
|  |              Z.T <= $\{Z\_T_0=6, Z\_T_3=3\}$, Z.F <= $\{Z\_F_0=6\}$ |
| THEN | STEP iii:  Use the TRUE partition of signals A, B, Z |
| B <= Z; | B.T <= Z.T |
|  | ∴ B.T = $\{B\_T_0=6, B\_T_3=3\}$ |
| ELSE | STEP iii:  Use the FALSE partition of signals A, B, Z |
| A <= Z; | A.F <= Z.F |
|  | ∴ A.F = $\{A\_F_0=6\}$ |
| END IF; | STEP iv: A <= A.T ∪ $\{A\_F_{0?\ 1}=6\} = \{A_0=2, A_1=6\}$ |
|  |             B <= B.T ∪ $\{B\_F_{0?\ 1}=4\} = \{B_0=6, B_1=4, B_3=3\}$ |
|  |             Z <= Z.T ∪ $\{Z\_F_{0?\ 1}=6\} = \{Z_0=6, Z_{0?\ 1}=6, Z_3=3\} = \{Z_0=6, Z_3=3\}$ |

FIG. 6

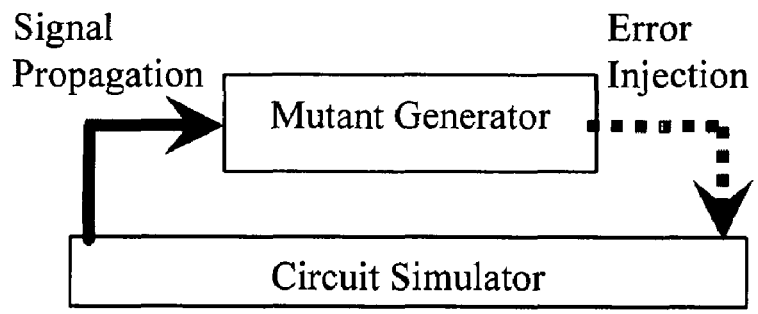
FIG. 7
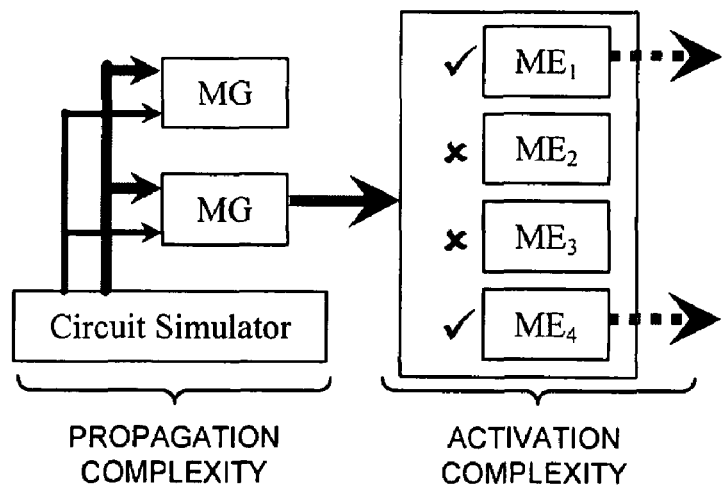
FIG. 8
|   | $\alpha_1$ | $\alpha_2$ | $\alpha_3$ | $\alpha_4$ | $\alpha_5$ | $\alpha_6$ |   |
|---|---|---|---|---|---|---|---|
| $S_1$ | X |   |   |   |   | X |   |
| $S_2$ |   |   | X |   |   |   |   |
| $S_3$ |   |   |   |   |   |   |   |
| $S_4$ |   | X |   | X |   | X | ←Iteration 2 |
| $S_5$ | X | X | X |   | X |   | ←Iteration 1 |
| $S_6$ | X |   |   |   |   |   |   |
| $S_7$ |   |   |   | X |   |   |   |
| $S_8$ |   |   |   |   | X |   |   |
FIG. 9

| Min 11 (00001011): $S_{min}$ = {xxxx1x11, xxxx11xx, xxx1xxxx, xx1xxxxx, x1xxxxxx, 1xxxxxxx} |
|---|
| Max 13 (00001101): $S_{max}$ = {0000xx0x, 0000x0xx, 00000xxx} |
| Range [11,13]: $S_R = S_{min} \cap S_{max}$ = { 00001011, 0000110x} |

FIG. 11

|      | A | B | Cin | Cout | Sum |      | A | B | Cin | Cout | Sum |
|------|---|---|-----|------|-----|------|---|---|-----|------|-----|
| I:   | 0 | 0 | 0   | 0    | 0   | VII: | 1 | 1 | 1   | 1    | 1   |
| II:  | 0 | 0 | 1   | 0    | 1   | VIII:| 1 | 1 | x   | 1    | x   |
| III: | 0 | 0 | x   | 0    | x   |      | 1 | x | 0   | V    |     |
|      | 0 | 1 | 0   | II   |     |      | 1 | x | 1   | VIII |     |
| IV:  | 0 | 1 | 1   | 1    | 0   | IX:  | 1 | x | x   | 1    | 0   |
| V:   | 0 | 1 | x   | 0    | 1   |      |   |   |     | x    | 1   |
|      |   |   |     | 1    | 0   |      | x | 0 | 0   | III  |     |
|      | 0 | x | 0   | III  |     |      | x | 0 | 1   | V    |     |
|      | 0 | x | 1   | V    |     |      | x | 0 | x   | VI   |     |
| VI:  | 0 | x | x   | 0    | 1   |      | x | 1 | 0   | V    |     |
|      |   |   |     | x    | 0   |      | x | 1 | 1   | VIII |     |
|      | 1 | 0 | 0   | II   |     |      | x | 1 | x   | IX   |     |
|      | 1 | 0 | 1   | IV   |     |      | x | x | 0   | VI   |     |
|      | 1 | 0 | x   | V    |     |      | x | x | 1   | IX   |     |
|      | 1 | 1 | 0   | IV   |     | X:   | x | x | x   | x    | x   |

FIG. 12

| Operation | Equivalent Statement | Operation | Equivalent Statement |
|---|---|---|---|
| not A<B | A>=B | not A=B | A>B or A<B |
| not A<=B | A>B | not A/=B | A=B |
| not A>B | A<=B | A/=B | A>B or A<B |
| not A>=B | A<B | abs A | A or (-A) |

FIG. 13

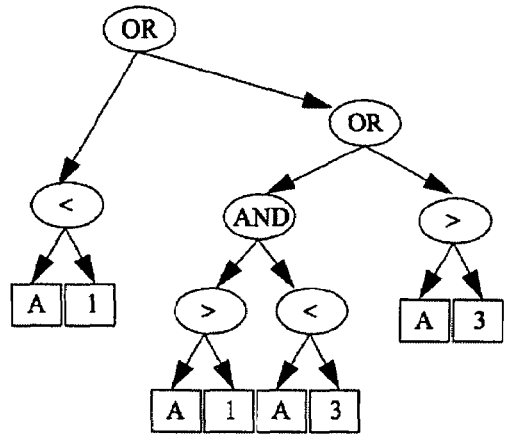

FIG. 17

```
CDG *CDG_RelationalOperators::reduce()
{
//Attempt to force a value of true onto this relational operator:
    bind_result_type result = this->force_solution(new Boolean_ValueRange(true));
    switch (result) {
    case FAIL:      //A contradiction was encountered
                    //(unconditionally false):
                    disconnect();
                    return (new CDG_BooleanLiteral(false))->connect();
                    break;
    case EXPENDABLE: //This sub-tree did not produce useful results
                    //(unconditionally true):
                    disconnect();
                    return (new CDG_BooleanLiteral(true))->connect();
                    break;
    case SUCCESS:   //This sub-tree is necessary:
                    return this;
                    break;
    }
}
```

FIG. 18

```
pc_mux: process(clk, pc_ctrl, pc ,out_alu, data_in, ea)
variable tempof: std_logic_vector(15 downto 0);
variable temppc: std_logic_vector(15 downto 0);
begin
    case pc_ctrl is
    when add_ea_pc =>
        if ea(7)='0' then tempof:="00000000" & ea(7 downto 0);
        else tempof:="11111111" & ea(7 downto 0);
        end if;
    when inc_pc =>
        tempof:="0000000000000001";
    when others=>
        tempof:="0000000000000000";
    end case;
    case pc_ctrl is
    when reset_pc =>
        temppc:="1111111111111110";
    when load_ea_pc =>
        temppc:=ea;
    when pull_lo_pc =>
        temppc(7 downto 0):=data_in;
        temppc(15 downto 8):=pc(15 downto 8);
    when pull_hi_pc =>
        temppc(7 downto 0):=pc(7 downto 0);
        temppc(15 downto 8):=data_in;
    when others =>
        temppc:=pc;
    end case;
    if clk'event and clk = '1' then
        pc <= temppc + tempof;
    end if;
end process;
```

FIG. 21

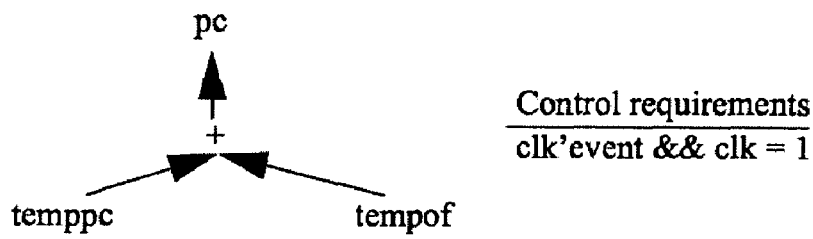

FIG. 22

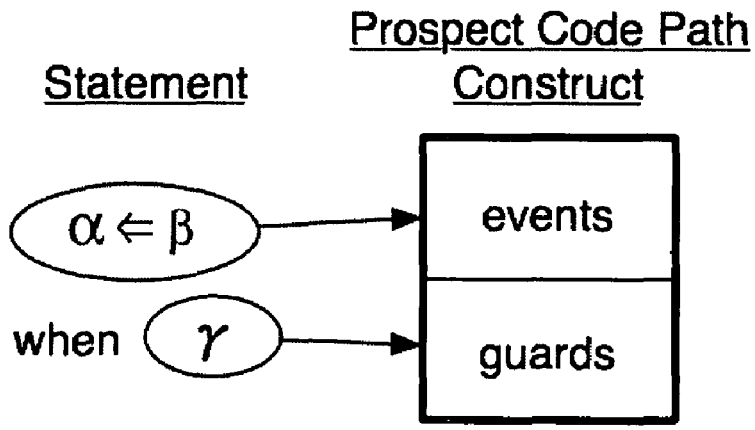

Precondition: Lp = list of all partitions from every cluster

ATVG-ITERATION(Lp)
1. Sort Lp into descending order of member size
2. P ← first partition in Lp
3. SUCCESS ← false
4. while P exists and SUCCESS = false
5.     if activation criteria for P is not met
6.         then TP ← generate activation pattern(s) for any inactive error in P while dropping errors from unsuccessful ATVG attempts
7.         if activation is successful
8.             then SUCCESS ← true
9.             else P ← next partition in Lp
10.     else TP ← generate propagation pattern(s) for any active design error in P while dropping errors from unsuccessful ATVG attempts
11.         if propagation is successful
12.             then SUCCESS ← true
13.             else P ← next partition in Lp
14. if SUCCESS
15.     then return TP
16.     else fail

FIG. 25

```
multiFSM_DFS(testSequence TS, constraintSet S, constraintSet Y, int l)
1.   If (l = 0) return FAIL
2.   If (Y ≠ ∅)
3.       let v ∈ Y
4.       U ← getAllIncomingTransitions(v)
5.       For each t ∈ U
6.           If (S = ∅) T ← t
7.           Else T ← S ∩ t
8.           If (T ≠ ∅ && multiFSM_DFS(TS, T, Y- v, l) = SUCCESS)
9.               TS ← TS + getPrimaryInputs(T)
10.              return SUCCESS
11.      Else
12.          TS ← getPrimaryInputs(S)
13.          return SUCCESS
14.  return FAIL
```

```
multiFSM_DFS(testSequence TS, pStateSet Y, int ℓ)
1.  If (l = 0) return FAIL
2.  If (Y = reset state)
3.      return SUCCESS
4.  P ← solve(Y)        //Generates set of solutions
5.  For each t ∈ P
6.      S ← get_previous_timeFrame(t)
7.      If (multiFSM_DFS(TS, S, ℓ-1) = SUCCESS)
8.          TS ← TS + getPrimaryInputs(S)
9.          return SUCCESS
10. return FAIL
```
FIG. 30
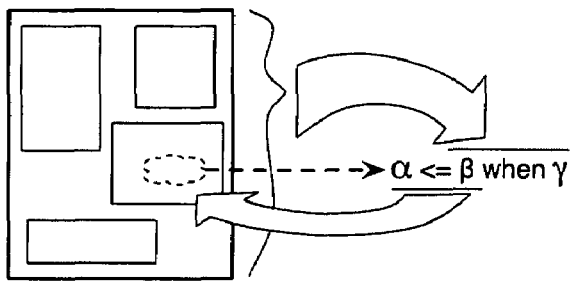   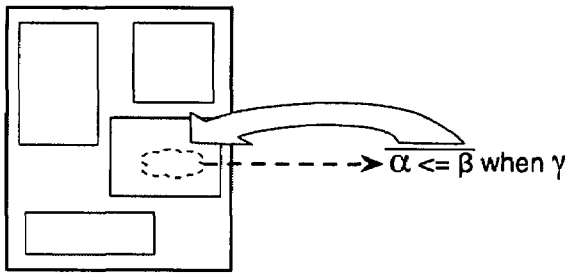
FIG. 31A          FIG. 31B
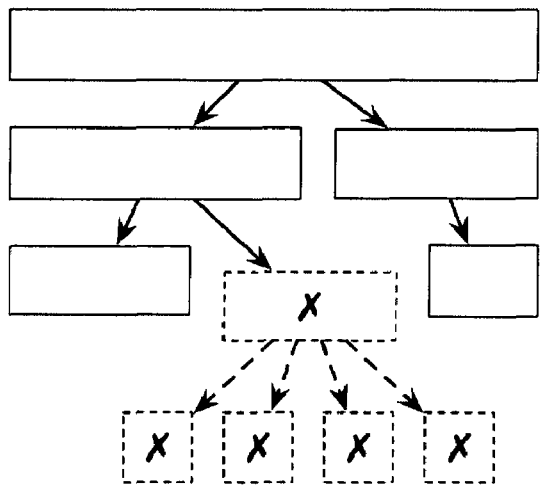
FIG. 32

```
multiFSM_DFS(testSequence TS, pStateSet Y, int l)
1.  If (l = 0) return FAIL
2.  If (Y = reset state)
3.      return SUCCESS
4.  P ← solve(Y)    //Generates set of solutions
5.  For each t ∈ P, s.t. t has the lowest weight in P
6.      If (weight(t)=0)
7.          l ← 0
8.          TS ← getPrimaryInputs(t)
9.          return SUCCESS
10.     S ← get_previous_timeFrame(t)
11.     If (multiFSM_DFS(TS, S, l-1) = SUCCESS)
12.         assign_weight(S, l)
13.         l ← l+1
14.         TS ← TS + getPrimaryInputs(S)
15.         return SUCCESS
16. return FAIL
```

FIG. 33

Precondition: pStates in Y have been pre-solved

```
multiFSM_DFS(testSequence X, pStateSet Y, int l)
1.  If (l = 0) return FAIL
2.  For each p ∈ Y, s.t. p has the lowest weight in Y
3.      P ← get_previous_timeFrame(p)
4.      For each p' ∈ P
5.          If (weight(p') = 0)   //reset state has been found
6.              l ← 0
7.              Y ← {p}           //remove unexplored pStates in Y
8.              X ← getPrimaryInputs(p')
9.              return SUCCESS
10.         S ← solve(p')         //Attain incoming pStates S from target pState Y
11.         If (multiFSM_DFS(TS, S, l-1) = SUCCESS)
12.             weight(p) ← l
13.             Y ← {p}           //remove unexplored pStates in Y
14.             l ← l+1
15.             X ← X + getPrimaryInputs(S)
16.             return SUCCESS
17. return FAIL                   //No ATVG goals (Y is empty) or no solution exists
```

FIG. 34

Precondition: pStates in Y have been pre-solved multiFSM_DFS(testSequence X, pStateSet VS, pStateSet Y, int $\ell$)
1.   If ($l$ = 0) return FAIL
2.   For each p ∈ Y, s.t. p has the lowest weight in Y
3.       P ← get_previous_timeFrame(p)
4.       For each p' ∈ P
5.          If (p' is masked by some state in VS)
6.             delete p'
7.          else
8.             VS ← VS + p'          //Store copy of p' into the visited set VS
9.             If (weight(p') = 0)          //reset state has been found
10.                $l$ ← 0
11.                Y ← {p}            //remove unexplored pStates in Y
12.                X ← getPrimaryInputs(p')
13.                return SUCCESS
14.             S ← solve(p')           //Attain incoming pStates S from target pState Y
15.             If (multiFSM_DFS(TS, VS, S, $l$-1) = SUCCESS)
16.                weight(p) ← $l$
17.                Y ← {p}            //remove unexplored pStates in Y
18.                $l$ ← $l$+1
19.                X ← X + getPrimaryInputs(S)
20.                return SUCCESS
21.   return FAIL

FIG. 35

AUTOMATICALLY GENERATING AN INPUT SEQUENCE FOR A CIRCUIT DESIGN USING MUTANT-BASED VERIFICATION

RELATED APPLICATION

This application claims priority under 35 U.S.C. section 119(e) to U.S. Provisional Application Ser. No. 60/808,006, entitled "MVP: A Mutation-Based Validation Paradigm," by inventors Jorge Campos and Hussain Al-Asaad, filed on 24 May 2006, the contents of which are herein incorporated by reference. This application also claims priority under 35 U.S.C. section 119(e) to U.S. Provisional Application Ser. No. 60/849,717, entitled "MVP: A Mutation-Based Validation Paradigm," by inventors Jorge Campos and Hussain Al-Asaad, filed on 4 Oct. 2006, the contents of which are herein incorporated by reference. This application also claims priority under 35 U.S.C. section 119(e) to U.S. Provisional Application Ser. No. 60/860,886, entitled "MVP: A Mutation-Based Validation Paradigm," by inventor Jorge Campos, filed on 22 Nov. 2006, the contents of which are herein incorporated by reference.

GOVERNMENT LICENSE RIGHTS

This invention was made with United States Government support under Grant No. 0092867 awarded by the National Science Foundation. The United States Government has certain rights in the invention.

BACKGROUND

1. Field of the Invention

The present invention relates to a technique which facilitates verifying the correctness of a circuit design. More specifically, the present invention relates to a technique that automatically generates an input sequence for a circuit design using mutant-based verification.

2. Related Art

Digital circuit design methodologies have reached a highly optimized state, but circuit verification methods used in design projects are still somewhat subjective in the way that they are applied by the verification engineer. Moreover, many competing circuit verification methods are available for high-level hardware descriptions, but none of these methods provide a stand-alone solution. As a result, circuit verification is still an "art" which is mastered by an engineer through experience and observation, as opposed to a systematic technique that can be easily and effectively applied.

Typical industry practices rely on random and pseudo-random approaches to eventually explore a sufficient portion of the circuit under verification (CUV). The simplicity in these practices allows for a high-frequency simulation, but the ability of the simulator to traverse new architectural states quickly diminishes over time. Deterministic practices, on the other hand, guarantee continued forward progress because they allow the circuit verification engineer to attack the problem head-on. However, the complexity of even moderately-sized circuits makes deterministic verification practices that exhaustively explore the design space computationally infeasible in a reasonable timeframe.

Hence, what is needed is a method and an apparatus for efficiently verifying circuit designs without the problems listed above.

SUMMARY

One embodiment of the present invention provides a system that automatically generates an input sequence for a circuit design using mutant-based verification. During operation, the system receives a description of the circuit design. Next, the system determines a target value (e.g., a default value) for a control signal in the description and a mutant value for the control signal. The system then determines if an input sequence exists for the circuit design that stimulates the control signal to the target value and causes the effects of the target value and the effects of the mutant value to reach an observation point in the circuit such that the effects of the target value and the effects of the mutant value differ at the observation point. If such an input sequence exists, the system then simulates operation of the circuit design using the input sequence. During simulation, the system generates two sets of signal values for the circuit design. The first set of signal values is affected by the target value for the control signal, while the second set of signal values is affected by the mutant value for the control signal.

In some embodiments of the present invention, the mutant value of a control signal is an erroneous value for the control signal that is injected into the circuit design to replace a default value for the control signal.

In some embodiments of the present invention, the description is a high-level description of the circuit design that is specified using a hardware description language.

In some embodiments of the present invention, the system identifies a set of constraints that define an activated state for the control signal that results in the control signal being set to the target value. A mutant construct is used to define these activation constraints for the control signal as well as the mutant value for the control signal. In these embodiments, the system determines an input sequence for the circuit design that achieves this activated state and causes the mutant value to be injected, and determines a second input sequence that can be used to propagate both sets of signal values from the activated state to any observation point.

In some embodiments of the present invention, the system determines the first input sequence by determining a reset input sequence that begins from the reset state for the circuit design and reaches the activated state.

In some embodiments of the present invention, the system generates the first set of signal values using the input sequence and the target value. In these embodiments, the system generates the second set of signal values using the input sequence, the target value, and the mutant value. When generating the second set of signal values, the system detects when, during simulation, the control signal reaches the target value. The system then changes the value of the control signal to the mutant value.

In some embodiments of the present invention, the system generates the two sets of signal values simultaneously using a mutant generator. During simulation, this mutant simulator generates the two sets of simulation outputs by simultaneously tracking multiple values for signals in the circuit design. The system can hence reduce simulation overhead by generating two or more sets of signal values simultaneously.

In some embodiments of the present invention, the system applies the described techniques to the control signals of the circuit design to deterministically generate input sequences that provide control-based coverage of the circuit design.

Providing control-based coverage of the circuit design facilitates detecting errors in the circuit design and helps the user to verify the correct operation of the circuit design.

In some embodiments of the present invention, the system analyzes the description of the circuit design to find the control signals in the circuit design. The system then builds a database of mutant constructs based on the target values and mutant values for the control signals, and then uses this database while generating a set of input sequences that stimulate the control signals.

In some embodiments of the present invention, the system uses the database to cluster mutant values and determine target areas in the circuit design with a higher density of control signals. In these embodiments, the system uses the database while generating the set of input sequences to ensure that all of the mutant values have been stimulated. Note that the database can be partitioned to facilitate continuously locating the largest remaining related set of unstimulated control signal values.

In some embodiments of the present invention, the system simultaneously stimulates multiple mutant values associated with a given control signal using the same input sequence.

In some embodiments of the present invention, the system analyzes a set of prospect states to find paths from the activated state both to a reset and to the observation point. These prospect states represent architectural states for the circuit design.

In some embodiments of the present invention, a prospect state includes two constraint-dependency graphs (CDGs). The first CDG defines a set of constraints to be satisfied simultaneously, while the second CDG defines a set of conditional values that allow the set of constraints to be satisfied simultaneously.

In some embodiments of the present invention, the system uses a CDG to solve a system of equations for statements in the description of the circuit design. The graph structure of the CDG facilitates appending additional constraints onto the CDG.

In some embodiments of the present invention, the system finds a path that balances trade-offs between a desired length for a potential path and the estimated computational effort involved in finding the potential path.

In some embodiments of the present invention, the system translates the input sequence into a format that facilitates user verification and understanding of the circuit design.

In some embodiments of the present invention, the system receives a user-specified input sequence for the circuit design. The system uses mutation-based verification to determine the control-coverage provided by this user-specified input sequence.

BRIEF DESCRIPTION OF THE FIGURES

FIG. 3A illustrates a finite state machine graph in accordance with an embodiment of the present invention.

FIG. 3B illustrates a code flow graph in accordance with an embodiment of the present invention.

FIG. 5 illustrates the implementation of an arbitrary operator in accordance with an embodiment of the present invention.

FIG. 6 illustrates concurrent design error simulation for a condition statement in accordance with an embodiment of the present invention.

FIG. 7 illustrates integrating a mutant value generator with a concurrent mutant simulator in accordance with an embodiment of the present invention.

FIG. 8 illustrates propagation complexity and activation complexity in accordance with an embodiment of the present invention.

FIG. 9 illustrates an example of clustering and partitioning in accordance with an embodiment of the present invention.

FIG. 11 illustrates generating a partially-defined bit-vector set from an integer range in accordance with an embodiment of the present invention.

FIG. 12 illustrates 1-bit addition for partially-defined bit-vectors in accordance with an embodiment of the present invention.

FIG. 13 illustrates replacements for undesirable disjoining operators in accordance with an embodiment of the present invention.

FIG. 17 illustrates a sample CDG after complete reduction in accordance with an embodiment of the present invention.

FIG. 18 illustrates how a relational operator can be reduced based on whether it is unconditionally true or unconditionally false in accordance with an embodiment of the present invention.

FIG. 21 illustrates an exemplary process implementation that uses signals and variables in accordance with an embodiment of the present invention.

FIG. 22 illustrates an incomplete CDG for signal pc in accordance with an embodiment of the present invention.

FIG. 24 illustrates a pictorial description for a prospect code path in accordance with an embodiment of the present invention.

FIG. 25 illustrates pseudocode describing the steps for each ATVG iteration in accordance with an embodiment of the present invention.

FIG. 30 illustrates pseudocode for using prospect states during ATVG in accordance with an embodiment of the present invention.

FIG. 31A illustrates run-time circuit profiling in accordance with an embodiment of the present invention.

FIG. 31B illustrates pre-processor circuit profiling in accordance with an embodiment of the present invention.

FIG. 32 illustrates basic-block guard profiling in accordance with an embodiment of the present invention.

FIG. 33 illustrates a modified multi-FSM DFS function in accordance with an embodiment of the present invention.

FIG. 34 illustrates a further-optimized ATVG function in accordance with an embodiment of the present invention.

FIG. 35 illustrates an optimize ATVG function that does not revisit previously-visited pStates in accordance with an embodiment of the present invention.

DETAILED DESCRIPTION

The following description is presented to enable any person skilled in the art to make and use the disclosed embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present description. Thus, the present description is not intended to be limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

1. Circuit Design and Verification

Figure 1:
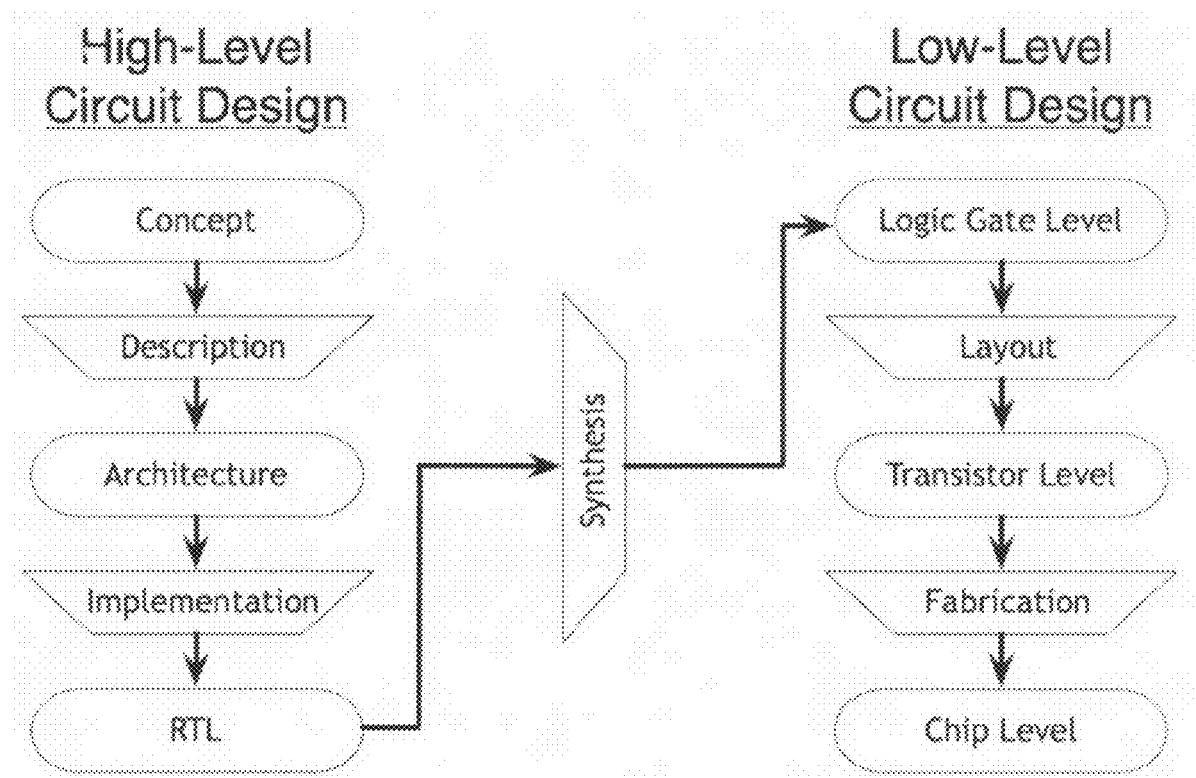
FIG. 1 illustrates the complete circuit design process in accordance with an embodiment of the present invention.

The design flow for creating an electronics component is typically lengthy, as depicted in FIG. 1. Initially, the lead architects create the design goals (architecture) for the project. The lead design engineers then create a preliminary implementation from this architecture, such that it meets all design goals. This preliminary implementation exists in the form of a computer program, and is known as a register transfer level (RTL) implementation because of its implementation style. It is during this phase that much of the design research is performed, and most power/performance optimizations are defined.

A project first resembles an actual circuit when the RTL code is converted into a logic gate level implementation, commonly through an automated process known as circuit synthesis. A logic gate circuit is a low-level implementation because it closely resembles the features that will be found on a fabricated chip, but it still abstracts-out the actual transistors. The final two circuit development stages, circuit layout and circuit fabrication, are closely tied to the ever-advancing transistor and fabrication technologies that allow for smaller and faster electronics.

The semiconductor industry includes of large companies with in-house fabrication capabilities, and small to mid-sized companies that outsource their fabrication needs. Outsourcing the fabrication of a prototype microchip can cost millions of dollars, giving these fab-less semiconductor companies an incentive to get their design right the first time. As a result, these companies have developed and relied upon a rigorous verification process that has given them a sense of security in the correctness of their final design prior to fabrication. Unfortunately, these verification strategies are human-intensive and have to be replicated and re-invented for each new design project.

1.1. Existing Verification Techniques

"Black box" is a commonly used term in engineering that refers to a system where the implementation details are not visible. It is no different for circuit verification. Essentially, "black-box" circuit verification is appealing because it does not require the verification system to have prior inside knowledge of the circuit under verification. This strategy, however, relies on random or pseudo-random input vectors to verify the "black box" because such a verification system has no way of efficiently deciphering how to generate the most effective input sequence.

Unfortunately, current systems are neither efficient nor effective enough to perform deterministic "black box" verification on complete large circuit implementations. Therefore, when handling complete large circuits such as microprocessors and ASICs, companies rely on a manual "white box" circuit verification strategy. Essentially, circuit design teams provide "inside" information to their verification system by building "self-testing" abilities around their implementations. This is commonly done by creating test scripts aimed at stimulating specific portions of the circuit under verification. Identifying and inserting this circuit knowledge into a verification system is one reason why circuit verification can sometimes consume 70% of the overall circuit design effort.

While the Electronic Design Automation (EDA) industry provides some circuit verification tools, these tools are not able to apply directed analysis on complete circuits for large projects. When seeking quality assurance on large circuits with as much as 250,000 lines of RTL code, semiconductor companies typically need to add extra code around their circuit designs to implement the verification system. This extra logic adds considerable complexity to the project, and can add many man-months for development. Furthermore, the present verification process relies on custom, man-made instruction sequences to verify the correctness of specific circuit scenarios. These efforts, along with unnecessary verification iterations, amount to a substantial portion of the overall verification process.

After the circuit design phase, companies often use an explicit quality assurance (circuit verification) phase where they use their hand-crafted instruction sequences and pseudo-random stimuli from their verification system to guide the chip's verification process until only a few non-critical bugs are exposed per verification cycle. However, it is common that these pseudo-random stimuli do not expose all critical bugs because the circuit simulator continues to explore the same portion of the circuit without advancing onto more complex scenarios.

For smaller circuits, the analysis tools may make use of existing circuit analysis technology. For instance, deterministic circuit verification software tools may attempt to analyze an RTL implementation by translating it into a logic gate level implementation and then seeking to verify this representation of the implementation. Unfortunately, this translation process takes time and adds an immense amount of detail into the implementation that causes the analysis for small RTL implementations with several thousand lines of code to be inefficient, and makes it impossible to analyze large RTL implementations with upward of a quarter of a million lines of code.

2. Mutant-Based Verification

One embodiment of the present invention uses a mutation-based verification platform (MVP) as a circuit verification tool for high-level hardware descriptions and to provide expert deterministic verification methods to the average design engineer. MVP can provide a complete and automated strategy for analyzing high-level hardware descriptions that only leaves the circuit design engineer to decide what portions of the circuit to verify, and not how to verify it. MVP can be used for all verification strategies; from formal to simulation-based, static assertion-based to dynamic assertion-based, deterministic automatic test vector generation (ATVG) to pseudorandom ATVG, and from a static code-coverage metric to any dynamic coverage metric. MVP's circuit analysis allows it to perform white-box circuit verification, while providing the simplicity of black-box verification to its users. MVP does not require a priori information on the circuit under verification for it to be effective, but instead gathers this information real-time.

Because the earlier design stages (FIG. 1) have a high level of abstraction (less detail), their corresponding implementations are known as high-level implementations. Similarly, the circuit-based implementations are known as low-level implementations. A lower-level implementation is derived directly from its previous higher-level implementations, so it is important that the high-level implementations are correct to prevent introducing the same design errors onto the lower levels. Thus, MVP's technology focuses on high-level RTL implementations for three reasons:

i. High-level implementations can be used to describe the functionality of complete circuits;
 ii. The most complicated design errors to expose are introduced in high-level RTL implementations; and
 iii. Design errors should not be transferred to lower-level implementations because fixing these errors then becomes more costly.

Figure 2:
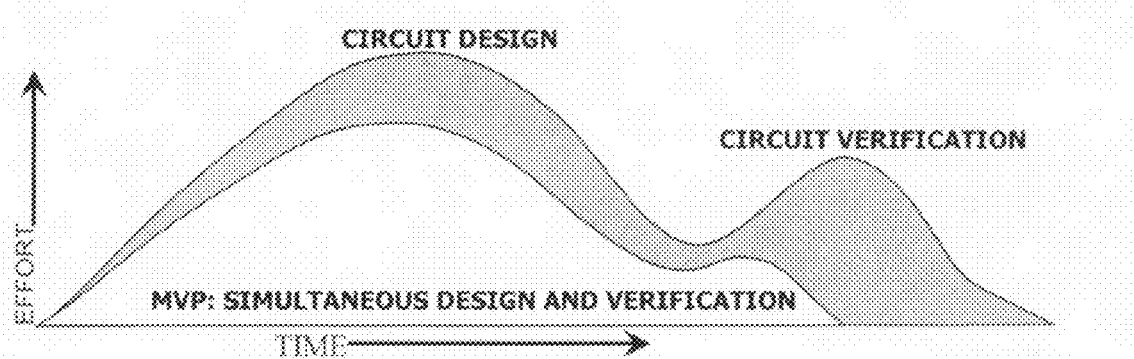
FIG. 2 illustrates the reduced time and effort involved in simultaneous design and verification in accordance with an embodiment of the present invention.

In one embodiment of the present invention, analyzing and verifying the correctness of circuit implementations as high-level RTL descriptions allows semiconductor companies to analyze large circuit implementations, and allows them to analyze these projects even before they are complete. Hence, use of MVP technology can allow a digital semiconductor company to reduce their design effort by eliminating the need to develop an intricate in-house verification strategy that is specific to their circuit implementation. Eliminating a group's need to invent a verification strategy allows MVP to further reduce a project's timeline by providing the possibility for simultaneous circuit design and verification, thus reducing significantly the magnitude of the final quality assurance phase, as depicted in FIG. 2.

MVP can give semiconductor companies control of their circuit design projects, following the idea that a circuit should not have to be presumably complete before it can be fixed—a problem does not have to escalate before it can be remedied. It allows circuit designers to avoid postponing their quality assurance efforts, thereby making fixing errors less difficult. MVP can provide systematic solutions that expose design errors in circuits that may still be under development, leaving engineers to only fix these errors as they are reported.

Semiconductor companies are experts in their in-house quality assurance methods, and they have grown emotionally attached to these practices because of the proven results and the assurance it provides them. Unfortunately, rising fabrication costs are causing these companies to increase their quality assurance efforts to 'try and get it right the first time' even through decreasing profit margins—posing a paradox for the semiconductor industry. MVP is meant to remedy this paradox by providing a standard circuit verification process that adapts itself to any high-level RTL circuit implementation, thus requiring circuit design companies to invest less time and human effort towards circuit verification. MVP can help automate the extremely inefficient circuit verification process, allowing high-level design engineers to more efficiently focus their energy on perfecting the circuit implementation. For instance, MVP can focus on exposing design errors as a continuous background process that analyzes the circuit implementation as it grows. A circuit verification engineer first identifies the goals for verification by employing coverage metrics that direct MVP, and a design engineer only fixes bugs as MVP discovers them; engineers no longer have to manually search for design errors.

Figure 39:
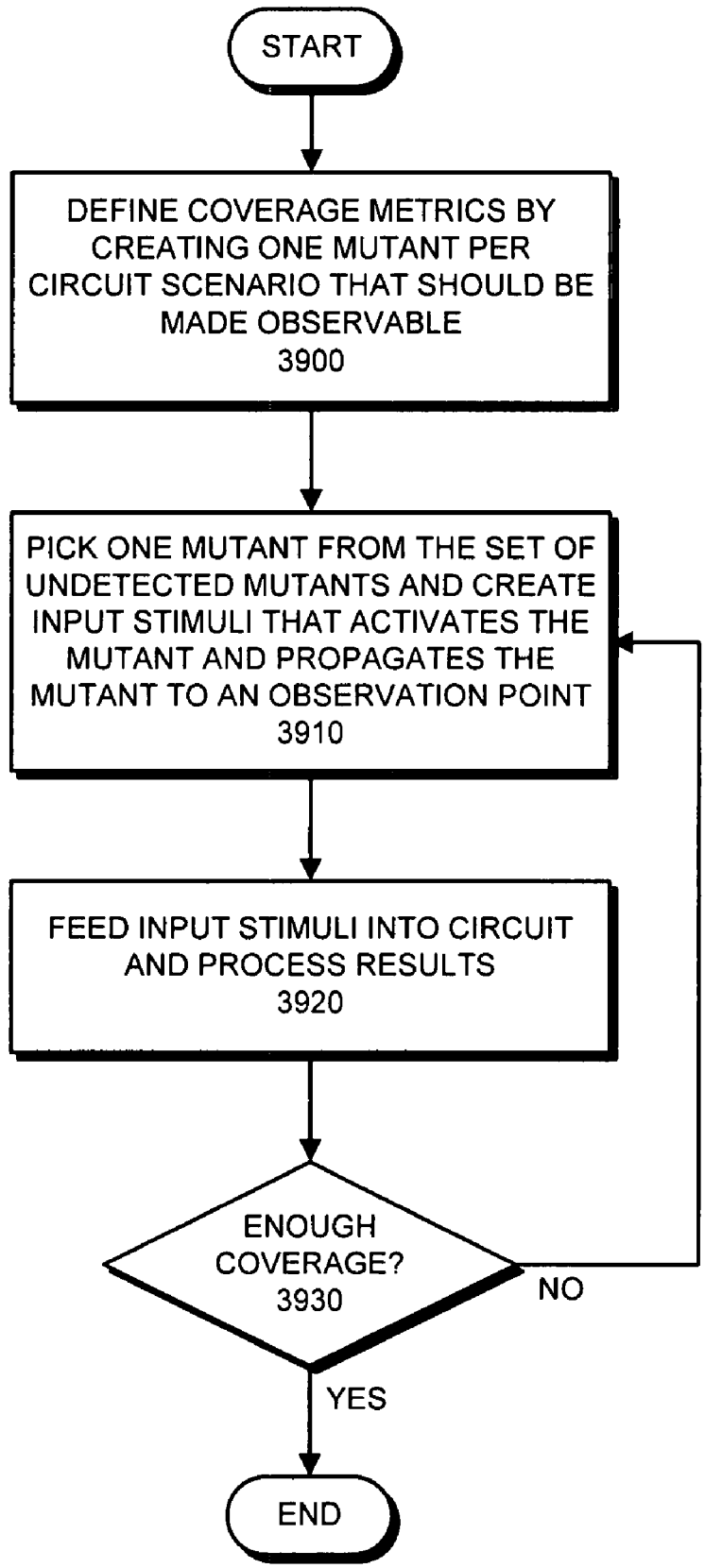
FIG. 39 presents a flow chart illustrating the process of verifying a circuit using mutant verification in accordance with an embodiment of the present invention.

FIG. 39 presents a high-level flow chart illustrating the process of verifying a circuit using mutant verification. First, the system defines a set of coverage metrics by creating one mutant construct for each circuit scenario that should be made observable (operation 3900). The system then picks one mutant construct from the set of undetected mutants and creates an input stimulus that activates the mutant construct and propagates a value for the mutant construct to an observation point (operation 3910). The system feeds these input stimuli into the circuit, and then processes the results (operation 3920). For instance, processing the results can involve getting an updated coverage reading and observing the response of the circuit to look for design flaws. The system then determines whether the circuit verification process has achieved enough coverage of the circuit design (operation 3930). If so, the process completes. Otherwise, the system proceeds to pick another mutant from the set of undetected mutants (looping back to operation 3910).

Note that a mutant (or mutant construct) represents a circuit scenario by describing a set of activation signals that each need to obtain a specific value for the circuit scenario to be satisfied, and introduces an altered state into the circuit by describing a set of target signals that alter their values to another specific value. During circuit simulation, a mutant becomes active when its set of pre-specified activation signals obtain their corresponding set of pre-specified values from the circuit simulation, at which point the mutant injects into a pre-specified set of injection points a corresponding set of erroneous (altered) values.

Figure 40:
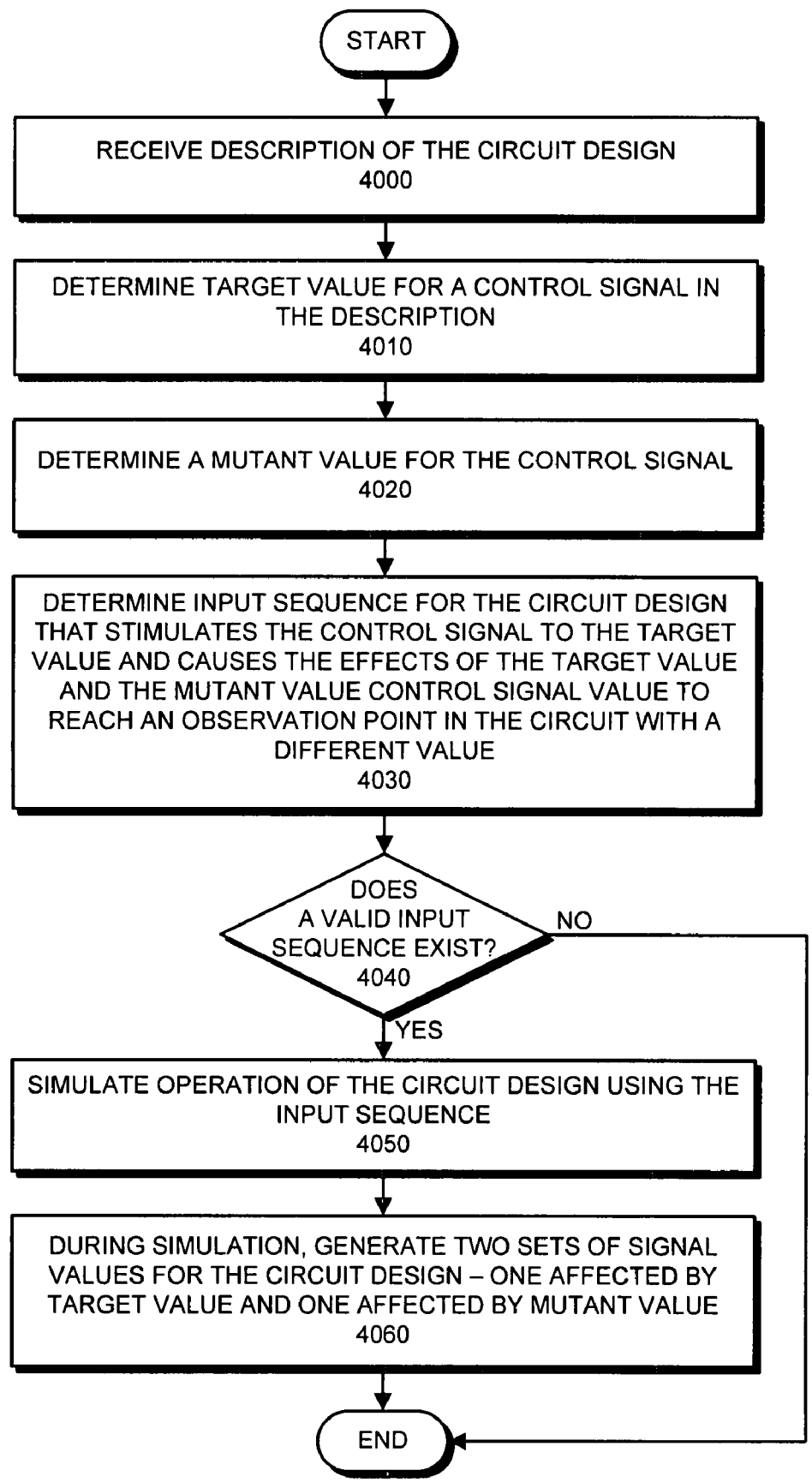
FIG. 40 presents a flow chart illustrating the process of automatically generating an input sequence for a single control signal in a circuit design using mutant-based verification in accordance with an embodiment of the present invention.

FIG. 40 presents a flow chart illustrating the process of automatically generating an input sequence for a single control signal in a circuit design using mutant-based verification. During operation, the system receives a description of the circuit design to be verified (operation 4000). The system then determines a target value for a control signal in the description (operation 4010) and a mutant value for the control signal (operation 4020). Next, the system determines if an input sequence for the circuit design exists that stimulates the control signal to the target value and causes the effects of the target value and the effects of the mutant value to reach an observation point in the circuit such that the effects of the target value and the effects of the mutant value differ at the observation point (operation 4030). Note that the two sets of effects are considered independently from the point where the control signal is stimulated to the target value. At this point, the effects of the mutant value are determined by substituting the mutant value for the control signal, while the effects of the target value are determined independently (without a substituted mutant value).

If such an input sequence exists (operation 4040), the system simulates the operation of the circuit design using this input sequence (operation 4050). During this simulation process, the system generates a first set of signal values that are affected by the target value for the control signal and a second set of signal values that result when the mutant value is substituted for the control signal (operation 4060). After the process completes, the system may return the input sequence to the user as an output.

Note that the system can generate an input sequence to activate a mutant in a separate operation from generating an input sequence that propagates the mutant to an observation point. These two operations do not need to be performed one after another as a single solution.

Figure 41:
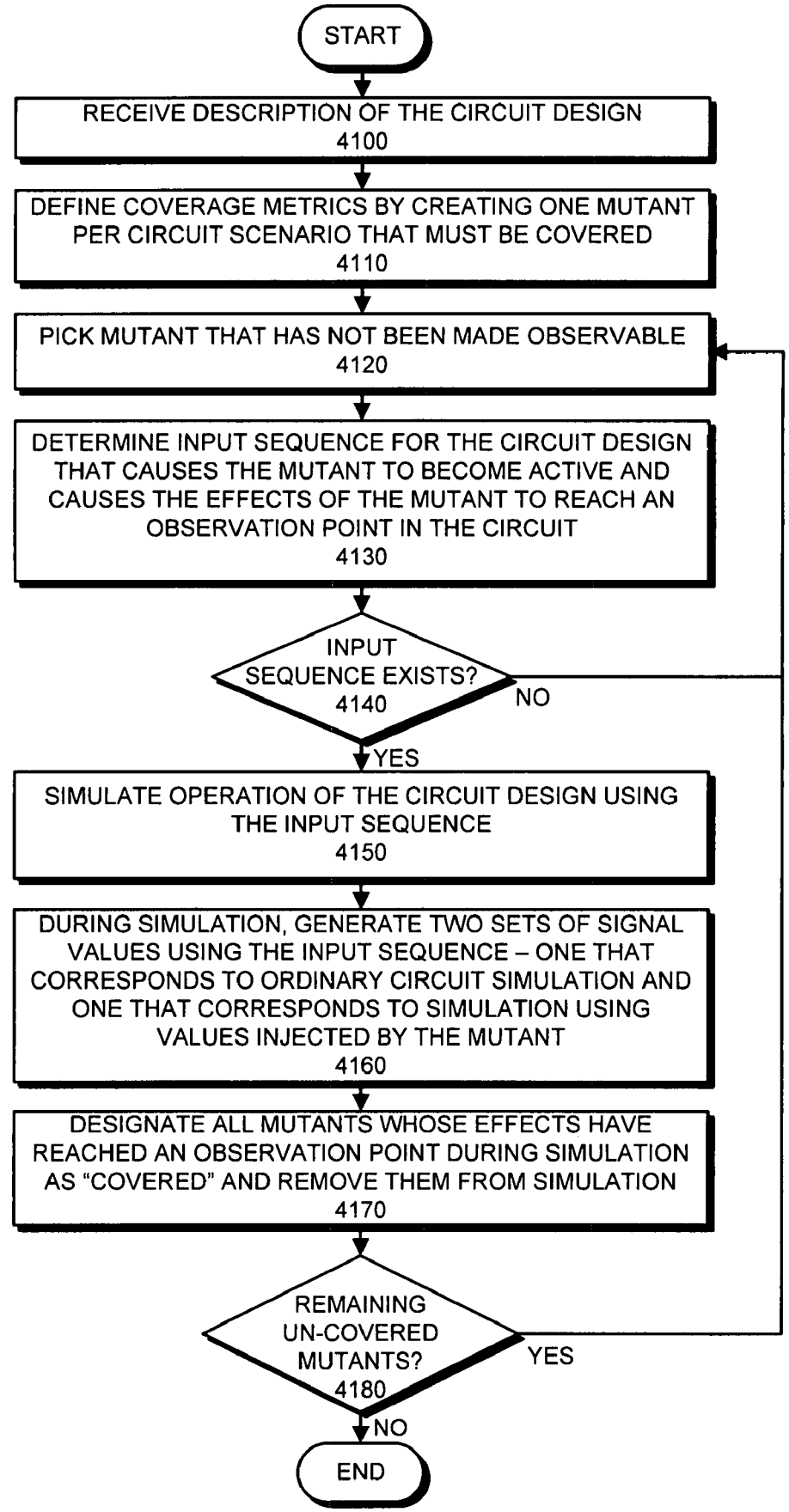
FIG. 41 presents a flow chart illustrating the process of automatically verifying a circuit design using mutant-based verification in accordance with an embodiment of the present invention.

FIG. 41 presents a flow chart illustrating the process of automatically verifying a circuit design using mutant-based verification. During operation, the system receives a description of the circuit design to be verified (operation 4100). The system then defines the coverage metrics by creating one mutant (or mutant construct) for each circuit scenario that needs to be covered (e.g. should be made observable) (operation 4110). Next, the system picks a mutant that has not been made observable (operation 4120) and determines an input sequence for the circuit design that causes the mutant to become active (I.e. that stimulates the activation signals of the mutant to their target values) and causes the effects of the mutant to reach an observation point in the circuit (I.e. causes the effects of the erroneous values injected by the mutant to reach an observation point of the circuit) (operation 4130). If no such input sequence exists (e.g. if there is no possible way to activate or propagate the mutant) (operation 4140), then the mutant is discarded without generating an input sequence and the process returns to operation 4120. Otherwise, the process continues to operation 4150. The system then simulates the operation of the circuit design using this input sequence (operation 4150). During this simulation process, the system generates a first set of signal values that correspond to an ordinary circuit simulation (I.e. corresponds to the default circuit simulation values) as well as a second set of signal values that results when the mutant's injected values propagate through the circuit (operation 4160). During this simulation process, the system activates all mutants that can be activated, and simulates the effects of all these mutants in a simultaneous fashion. For each mutant whose effects have reached an observation point of the circuit, it is designated as "covered" and removed from the simulation (operation 4170). If un-discarded mutants remain that have not been covered (operation 4180), the system returns to operation 4120. Otherwise, the process terminates.

The operations described in FIGS. 39-41 are described in more detail in the following sections.

2.1. Coverage Metric Design and Implementation

Coverage metrics are important for circuit verification. Coverage metrics describe the degree to which the circuit design has been tested.

Sequential circuit implementations were first designed at the logic gate level, which led to coverage metrics that are directly related to the physical circuit. An exhaustive coverage metric would attempt to apply every possible input vector onto every architectural state of the processor. This, however, typically leads to the state explosion problem because a circuit with $2^n$ internal states and an m-bit input bus will require $2^{m+n}$ circuit scenarios to be covered. Two popular alternatives that reduce this coverage space include state coverage, and transition coverage. If we were to generate a directed graph for a microprocessor's complete FSM, we would see that a state coverage metric simply attempts to reach every reachable processor state in the graph. A transition coverage metric, however, attempts to obtain more coverage by taking every possible transition in the FSM graph. Another popular FSM-based coverage metric is the path-coverage metric. This coverage metric encapsulates transition coverage, and can potentially be more complex than the exhaustive coverage metric. It attempts to exercise every possible state sequence that is within a given length, it therefore can encapsulate the exhaustive coverage metric when the path lengths are sufficiently long at the cost of achieving redundant state coverage.

With the advent of hardware description languages (HDLs) came a series of code-based coverage metrics for circuit designs. These coverage metrics already existed for computer programs, but HDLs allowed them to make their debut in the world of sequential circuits. Three of these code-based coverage metrics include line coverage, transition (branch) coverage, and path coverage. If we dissect each process statement in a microprocessor's HDL implementation into a collection of basic blocks, we can generate a graph that shows the possible program flows for each process (as shown in FIG. 3B). From this graph we can see that statement coverage is synonymous to state coverage of an FSM because it merely requests that each basic block be reached and all its statements be executed. Both the transition and path coverage metrics for HDL code are also somewhat similar to their corresponding FSM coverage metrics, however not as rigorous. We can see in FIGS. 3A-3B via the bold paths how an FSM path includes more explicit transitions ($\{T_1, T_5, T_8, T_9, T_{10}, T_{11}\}$) than the corresponding path from a substantially similar graph produced by a code-coverage metric ($\{T_2, T_4\}$).

An FSM path provides a more rigorous functional coverage than a code-based path because a transition exists between every pair of sequential states, as opposed to a code-based path where a transition only exists at each decision point (branch operation). Furthermore, in a high-level hardware description where many signal events can happen at the same atomic time instance, the execution of a complete code path within a process can be activated by a single state in the FSM. In other words, given the blocking nature of signals, it is possible for a process to complete a code path such that the signal values used at every decision point are taken from a single state in the FSM. As an example, the transitions $T_2$ and $T_4$ in FIG. 3B can happen in the same FSM state if there are no delay statements within basic block 3. An FSM analysis is therefore more suitable for tracking our progress towards a complete functional coverage of a high-level hardware description, but the information from a code-based circuit analysis can point towards achieving the desired FSM coverage.

2.1.1. A Control-Based Coverage Metric

It is important to employ a coverage metric that reduces the search space from an exhaustive coverage metric without notably degrading the quality of the tests that result from it. This step is important to the development of a successful verification platform because an inefficient coverage metric will require too many ATVG iterations, and an over-simplified coverage metric will sacrifice the effectiveness of the resulting input sequence.

In one embodiment of the present invention, the system uses a control-based coverage metric for mutation-based verification that encapsulates all preceding coverage metrics. The dependencies from control signals onto the architectural state space form the basis for this coverage metric, and exploiting these dependencies allow for a novel implementation that reduces the verification search space without sacrificing any effectiveness in the coverage metric.

A microprocessor's explicit processor state can be defined by combining all the control registers. A simple 16-bit processor with a 5-stage pipeline would therefore include a state register that is at least 64 bits wide; this being because each of the last four pipeline stages include a control register that holds the currently residing instruction. The state register would be even larger for superscalar microprocessor implementations because they employ a distributed control methodology through many disjoint and cooperating functional and control units. Any attempt to even perform a complete state coverage would face the wrath of the state explosion problem, so a more effective method needs to be employed. Instead, the MVP verification system achieves complete coverage of the control signals from which the architectural state space is derived.

Given that modern superscalar microprocessor implementations are modular in nature, it is reasonable to request for each of these functional and control units to be verified against their description before the microprocessor is verified as a whole. With this request, the microprocessor-wide verification problem is reduced to one of verifying the correctness of the control signals that merge these units together. Typically, over two-thirds of the bug occurrences in pipelined and superscalar microprocessor implementations are related to design errors in the control logic. Hence, a coverage metric that ensures that every possible value for each of these control signals is exercised for every possible processor state is very desirable.

Figure 4:
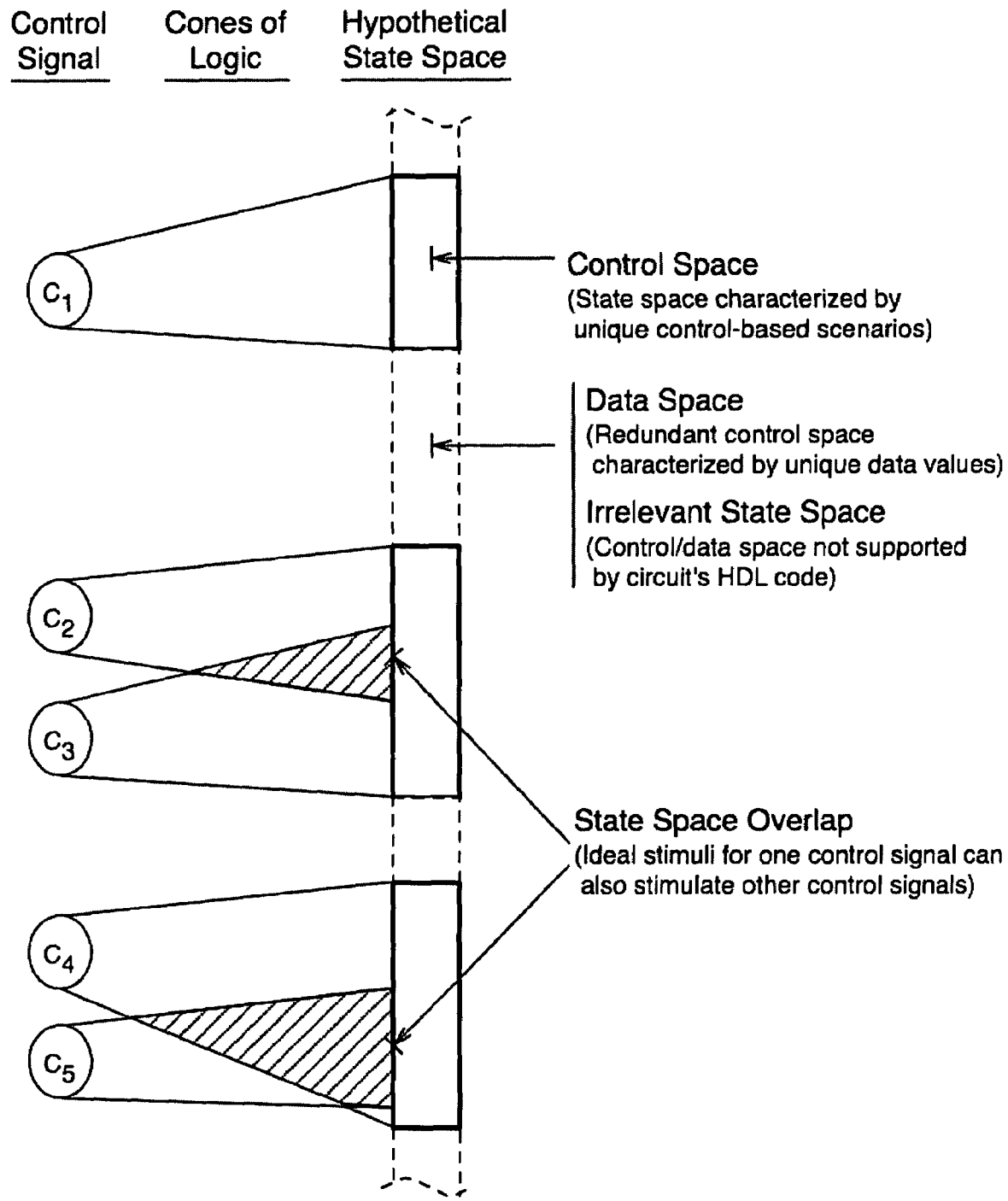
FIG. 4 illustrates how the cones of logic for a set of control signals can map to a hypothetical state space in accordance with an embodiment of the present invention.

Such a coverage metric may seem like an even harder coverage metric to employ than the state coverage metric, but it can actually reduce the state space by ignoring the redundant and irrelevant state space. FIG. 4 illustrates how the cones of logic for a set of control signals can map to a hypothetical state space, and how this translates into a control-based coverage metric.

2.1.2. Mutants

In one embodiment of the presentation, a mutant construct (or "mutant") is a circuit scenario described by a set of activation signals that each need to obtain a specific value for the circuit scenario to be satisfied, and introduces an altered state into the circuit by describing a set of target signals that need to alter their values to another specific (erroneous) value. Mutants can be used to instantiate a control-based coverage metric, as well as other types of coverage metrics.

Instantiating a coverage metric through a set of mutants can be highly dependent on the implementation style of the circuit under verification. Hence, a versatile definition of a mutant construct that allows it to be applied onto any coverage metric under any circuit implementation is necessary. Injecting an error typically results in the generation of an erroneous value under a specific state of the system, because circuit design errors and physical faults are governed by the laws of causality. Such a cause-and-effect characteristic can be harnessed to define the mutant construct. An error model is defined by three basic characteristics: 1) the activation criteria, 2) the consequence of activation, and 3) error injection. A mutant construct can be defined as the many instantiations of an error model that span a given design space. Numerous mutants can be simulated concurrently; therefore each mutant construct has a unique identification number.

A mutant's activation criteria specify a set of signals and the conditions that they need to satisfy before the mutant is activated. The activation criteria can be implemented as a collection of signal/value pairs that need to be satisfied before the mutant can be inserted into the simulation system. The values in a mutant's activation criteria are termed "default" simulation values because they describe the value that would be observed if the mutant were not to be injected.

Once the activation criteria of a mutant construct are met, its consequence of activation can be analyzed to determine how this mutant will alter the simulation. A mutant's consequence of activation can also be implemented as a collection of signal/value pairs that specify exactly how this mutant will alter the simulation run. The signal values in a mutant's consequence of activation are termed "erroneous" simulation values or "mutant values". The definition for a mutant's consequence of activation should not allow for a signal's value to mutate into itself, because that would be unproductive. As a result, the list of signals in a mutant's consequence of activation typically must be a subset of the signals in its activation criteria, and their erroneous values typically must be different from the corresponding default values.

The mutant values are injected into the specified signals within the circuit during error injection, which follows immediately after a mutant's activation criteria is satisfied completely by the current circuit simulation values. A mutant's error injection system can be implemented as a list of signal locations in the hardware descriptions that correspond to the signals specified in the consequence of activation, and a subroutine that injects the mutant's erroneous values into these signal locations. Error injection is the process of inserting an erroneous value into a simulation system for the purpose of investigating its effect, and it is discussed in detail in later sections. Whenever a mutant has been successfully injected into a simulation system, it is considered to have been "activated."

Given that a design error on an implementation of a modular component will appear on every instantiation of that component, all mutant constructs have to obey the hierarchical error model where every instantiation of a modular component will have the same set of mutants with corresponding identification numbers. This allows a design error to simultaneously appear at multiple instantiations of a component if necessary, and it correctly models aliasing in the case where these mutant values mask each other's propagation across the circuit. In contrast, physical faults can appear within a modular component independent of all other instantiations of that modular component, therefore physical fault models do not need to obey the hierarchical error model.

2.1.3. The Mutant Construct

In one embodiment of the present invention, a mutant construct (or "mutant") can be defined as a quadruplet (s, c, vc, ve) such that the explicit processor state s and a correct value(s) vc of the control signal(s) c act as the activation criteria and such that the signals in the set c act as the injection points. Signals in c are mutated from vc to an erroneous value ve as a consequence, and injected back into signal c.

2.1.4. Implementing the Control-Based Coverage Metric

In one embodiment of the present invention, the system automates the generation of mutant constructs such that they span a control-based coverage metric, and can be used to instantiate a complete collection of mutants for any given hardware description. Performing automated generation of such mutants can be especially influential for large and complex hardware descriptions, such as superscalar microprocessor implementations, because of their inherent complexity. As previously mentioned, an explicit processor state can be defined by the concatenation of all control registers in a microprocessor implementation. If one were to analyze the data dependency of a control signal onto the set of registers and primary inputs, one would see that each control signal is dependent on only a subset of the control registers. It is therefore possible to prune the state space without consequences as follows: For each control signal c that we plan to stimulate, we first identify the set of circuit conditions that affect the value of that control signal and denote this set as s. Then for every correct value vc of control signal c under every possible value of s, we generate a set of mutants that modifies c from vc to all erroneous values ve (such that vc≠ve) and inject their corresponding ve back into c.

This error modeling technique is effective because it only generates useful mutants for every control signal by first identifying the relevant state space. The set of relevant state space for a particular control signal can be found easily by analyzing the code-based constraints that allow the control signal to be stimulated (the guards from a conditional statement) and the values that are assigned to it. This involves creating a form of data dependency graph around these control signals, and then solving these graphs to decipher the allowable values for these signals. MVP's constraint dependency graph (CDG) construct is described later in this disclosure, along with a description of an efficient solver for these graphs and a set of subroutines that can create them from a hardware description. The information gathered by these CDGs can be used directly to define a collection of mutants for a specific control signal.

2.2. Concurrent Mutant Simulation

Mutation-based verification techniques attempt to circumvent the complexity in exploring any coverage metric exhaustively by using mutants as guidance. Error modeling for circuit verification can be used to create an artificial collection of simple design errors (mutants) that span throughout the corner cases of a circuit implementation. Mutants can therefore act as markers that are spread across the unexplored corners of a circuit's design space to help indicate where verification efforts should focus on next.

As a consequence to the coupling effect between simple and complex design errors, an input sequence that is capable of detecting these known simple errors is implicitly capable of detecting complex design errors as well. Therefore, an MVP concurrent mutant simulator can grade an input sequence's ability to expose complex design errors by concurrently and efficiently applying it to the complete set of mutants that represent the simple errors, and reporting the mutant coverage for that input sequence.

In one embodiment of the present invention, mutation-based circuit simulation is used to perform mutation-based testing. Post-silicon testing efforts typically use a coverage measure that is capable of affecting the maximal set of possible physical fault sites. Once the fault sites are defined, an error model can be designed to span the complete coverage measure. These error models, known as physical fault models, can be used in conjunction with a concurrent mutant simulator to grade an input sequence's ability to detect possible physical faults and to give an architect valuable testability analysis on his implementation.

2.2.1. Fault-List-Enabled Signals

In one embodiment of the present invention, an initial step in developing a high-level concurrent error simulator determines how a signal should maintain its fault list, and how the basic signal operations should be performed on the complete fault lists. In one implementation, a signal is first defined as an object that includes a default value and a list of mutant values, where each mutant value m in the signal S is a result of the corresponding parent mutant construct. The parent construct of a mutant value m is denoted by $\pi(m)$ such that the set of mutants $m_i$ that affect signal S is denoted by: $\Pi(S)=\cup_j \pi(m_j)$. It is common that aliasing occurs between the default value and one or more mutant values, in which case it is advantageous to collapse the error lists as a way to minimize the memory demand and the number of operations needed by each list.

The simulator takes as input a collection of mutants E, which are used to generate and insert a mutant value into a specific fault site when appropriate. Let $a_i$ be the set of mutant values in signal A, such that $a_i=0$ denotes the default value and $a_{i\neq 0}$ denotes the mutant value associated with the mutant construct $\pi(a_i)$ that has an ID value i. Given that the fault list-enabled signals implement fault collapsing, an arbitrary mutant value $a_i$ will only exist in signal A when all of the following conditions are met:

i. The mutant construct $\pi(a_i) \in E$ has been activated.
  ii. The corresponding error has been injected or propagated into signal A, thus producing the mutant value $a_i$.
  iii. The corresponding mutant value $a_i$ is not aliased by the default value $a_0$ ($a_i \neq a_0$).

Based on the above definition of a signal's fault list, let a∘b denote an arbitrary operation on two signal values, and let A∘B denote the same arbitrary operation performed over all signal values $a_i$ and $b_i$ in signals A and B, respectively, such that an operation $a_i \circ b_{j\neq i}$ is not allowed because an operation cannot be performed across mutants. In the case where $\Pi(A) \neq \Pi(B)$, a request for an implicit (non-existent) mutant value $a_{i\neq 0}$ results in the generation of the requested value from the default value. Let the generation process for mutant i be denoted by $a_{0 \rightarrow i}$. A value generated from the default value can be referred to as an implicit value, and a value extracted directly from the fault list can be referred to as an explicit value.

There is no distinction between a mutant value that has been aliased by the default value and a mutant value corresponding to a mutant that has not been activated. One can therefore assume that any mutant value not present in a fault list has been aliased, and it is correct to generate the corresponding mutant value from the implied default value upon demand. This allows the following operation to be defined across two fault lists that don't include mutant values from the exact set of mutant constructs:

$$Z = A \circ B:$$

$$\forall \pi_i \epsilon \Pi(A) \cup \Pi(B) | Z = \cup \{a_i \circ b_i\}$$

This operation is illustrated for a set of sub-operations depicted in FIG. 5. Consider the example where $A=\{a_0, a_3, a_5\}$ and $B=\{b_0, b_4, b_5\}$. The operation $Z=A \circ B$ is decomposed into the set of sub-operations $\{z_0=a_0 \circ b_0, z_3=a_3 \circ b_{0 \to 3}, z_4=a_{0 \to 4} \circ b_4, z_5=a_5 \circ b_5\}$ as illustrated in FIG. 5. Furthermore, if the value generated by the operation $a_5 \circ b_5$ is aliased by the value generated by the operation $a_0 \circ b_0$, then the resulting set of values in signal Z will be $Z=\{z_0, z_3, z_4\}$ after fault collapsing.

2.2.1.1. Operation INSERT_MUTANT (L, m)

In one embodiment of the present invention, an operation INSERT_MUTANT inserts the mutant m into the fault-list L while preserving fault-collapsing and L's ordering of increasing mutant ID. If m's ID corresponds to the default value ($\pi(m)=\emptyset$), then it will update L's default value if and only if L does not contain mutant values. The simulation engine should never need to replace the default value when a fault-list exists, so the list L should be empty when m corresponds to the default value. Otherwise, if m's value is aliased by the default value, then m is not inserted into L and any item with a matching ID is removed from L to implement fault-collapsing. If neither of the above two conditions are met, then m is inserted into L, replacing any item with a matching ID.

Each fault list can be implemented by a linked list of mutant values, ordered by increasing mutant ID, and referenced by a starting pointer and an ending pointer. This configuration allows for an insertion to the end of the fault list to be completed in O(1) time. Otherwise, if the mutant being inserted belongs somewhere within the fault list, the insertion is completed in O(n), where n is the current size of the fault list. INSERT_MUTANT is typically called from either an operation on a signal, or from the mutant generator itself. The mutant generator typically only executes at most once per simulation iteration, thus if only basic operations are being performed on signals, then the many O(1) time insertions by operations on signals far outweighs the few O(n) insertions by the mutant generator.

2.2.1.2. ARBITRARY_OPERATION (f, L1, L2)

In one embodiment of the present invention, an operation ARBITRARY_OPERATION performs the basic arbitrary operation f on all items of the fault lists L1 and L2 by the rules described earlier, such that f is a simple operation which executes in O(1) time. Given that the items in each fault list are sorted in the order of increasing mutant ID, this operation is best implemented by assigning a traversing pointer to each input list (let us denote these pointers as p1 and p2) starting at the default value and operating on all items of L1 and L2 in order of increasing ID. The items of L1 and L2 are not expected to belong to the same set of mutants, therefore implicit value generation is performed when the items of p1 and p2 do not belong to the same mutant. When this happens, the pointer with a larger mutant ID hints that the default value from its list should be used instead.

After the operation m=f(p1,p2) is executed and the mutant m is inserted into the return list, the traversing pointer whose mutant has a smaller ID is updated with the next mutant in its list. If p1 and p2 point to descendants of the same mutant ID value, then both p1 and p2 are updated with the next mutant in their respective fault lists. Given that INSERT_MUTANT can insert a mutant m into a list L in O(1) time if m belongs at the end of L, every insertion into the target signal will operate in O(1) time because each mutant being inserted into the resulting list has an ID greater than all previously inserted mutants. Therefore, performing an operation f on all items of the operand lists L1 and L2 takes O(|L1|+|L2|) time. In practice, however, the time to operate on both lists will be shorter whenever one or more mutant constructs have a mutant value in both L1 and L2 ($\Pi(L1) \cap \Pi(L2) \neq \{\emptyset\}$).

Other operations important to high-level hardware descriptions may be more difficult to implement than the arbitrary operator, and may not run in linear time, such as operations on signal arrays. The index of the array is a signal implemented by a fault-list, thus the value accessed by the index typically is the union of the values accessed from the default index location with the mutant values accessed from every mutant index location. In other words, the operations on signal arrays can be represented by:

$$A = M[X]:$$

$$\forall i \in \prod(M[x_0]) - \prod(X), \quad A = M[x_0]_0 \bigcup_i M[x_0]_i \bigcup_j M[x_j]_j$$

$$\forall j \in \prod(X)$$

$$M[X] = A:$$

$$\forall i \in \prod(A) - \prod(X), \quad M[x_0] = a_0 \bigcup_i a_i$$

$$\forall j \in \prod(X) \quad M[x_j] = (M[x_j] - M[x_j]_j) \bigcup_j a_j$$

Note that these operations may also rely on implicit mutant value generation when necessary.

2.2.2. Propagating Fault Lists Across Condition Statements

In one embodiment of the present invention, the development of a concurrent mutant simulator for high-level hardware descriptions involves the conceptualization of a method to implement conditional execution on signals containing a fault list. The problem of executing a statement based on a fault list-enabled condition is that the condition will be met by some of the mutants and not by others. As a result, the fault list of the signals in the condition statement needs to be split into two partitions: the set of mutants that meet the condition, and the set of mutants that do not.

When executing a condition statement, the actions performed by the simulator can include:

i. The condition needs to be evaluated using comparison operators to create a Boolean fault list.

ii. All the signals used within the condition statement need to be initialized via partitioning such that the target partition for each fault list item is specified in the condition fault list.

iii. The TRUE partition of each signal is used within the then portion of the condition statement, and the FALSE partition of each signal is used within the else portion of the condition statement.

iv. Upon termination of the condition statement, the initialized signals have their fault list rebuilt via the recombination process. The values extracted from the partition that corresponds to the default value of the condition are merged with the values extracted from the other partition that are explicitly identified by the condition fault list.

An example of the above points analyzes the scenario illustrated in FIG. 6. Step (i) is used to generate the condition fault list and step (ii) is used to initialize the variables for conditional execution. Step (iii) is used to execute the cases in the condition statement, and step (iv) is used to extract the mutant values from the TRUE and FALSE partitions and merge them back into the fault list. Notice that the presence of C1 in the condition variable is used by the simulator to generate the mutant value B1 from B's FALSE partition during the recombination phase in step (iv). A substantially similar operation occurs when performing the recombination process on the signal Z such that Z1 is generated from the default value of the FALSE partition. In this situation however, Z1 is collapsed as it is inserted into the fault list due to redundancy with the default value Z0. Note that the TRUE and FALSE partitions exist as signal instantiations themselves, thus nested condition statements are handled in a nested fashion.

Step (ii) can be implemented as an adaptation to the arbitrary operator, and be handled by a procedure INIT_CONDITION(C, L). In this procedure, the inputs to the function f (introduced in the following description) are the items in the initializing condition C (pointed to by p1) and the items in the fault list L of the signal being initialized (pointed to by p2). The result of the operation is a partitioning of L into the fault lists L_T and L_F such that for every mutant $\pi i \in \Pi(L) \cup \Pi(C)$, Li is transferred into the TRUE partition L_T if ci=true; otherwise Li is transferred into the FALSE partition L_F. Each mutant Li being inserted into L_T or L_F has an ID greater than any previous inserted mutant, therefore each insertion into L_T and L_F is guaranteed to run in O(1) time. Just as with the arbitrary operator, the operation INIT_CONDITION is guaranteed to run in $O(|C|+|L|)$ time.

Step (iv) can also be implemented by an adaptation to the arbitrary operator, handled by a procedure RECOMBINE(C, L_T, L_F). In one embodiment, the complete partition that corresponds to the default value of the condition is merged with the implicit values of the other partition as specified by the condition. Therefore, one pointer traverses the partition that corresponds to the default value of the condition and the other pointer traverses the condition fault list C. Let us denote the partition that corresponds to the default value of the condition by L_FF, and let us denote the other partition by L_nFF. Given that the partitions are deleted at the end of this procedure, and that values are extracted in the order of increasing ID, this procedure is best implemented by destructively extracting values from L_nFF. This is important because each access of L_nFF will begin from the start of the fault list, and it is important to remove all used and discarded values as a way to minimize the runtime for all subsequent accesses. This extraction process guarantees that at most $|C|+|L\_nFF|$ values are extracted, generated, or discarded from L_nFF. There are $|L\_FF|+|C|$ insertions into the signal being recombined, therefore the procedure RECOMBINE has a runtime complexity of $O(|C|+|L\_T|+|L\_F|)$.

2.3. Integrating Mutant Value Generation into the Circuit Simulator

In one embodiment of the present invention, the core concurrent mutant simulator does not produce mutant values, but instead primarily propagates them. The mutant values are generated by separate engine(s) denoted as mutant value generator(s). This results in a simulation environment that can adapt to any design-based/fault-based error model by creating the appropriate mutant value generator(s) that are in charge of inserting the appropriate mutant values into the appropriate signal(s) under the appropriate condition(s).

Consider a feedback circuit to conjecture on the methods of generating mutant values. When a mutant is first activated in the circuit, it generates a mutant value that might feed back to the same activation site to re-activate the mutant. At this point, it generates a mutant value from an already mutant signal. As a result, a mutant generator is activated by signals such that its corresponding mutant value is given higher preference over the default value. I.e., the mutant generator uses a signal's default value if and only if a mutant value of corresponding ID tag does not exist. Furthermore, any mutant values that are inserted into a signal will replace the previous corresponding mutant value if it exists.

2.3.1. Implementation Alternatives

In one embodiment of the present invention, a mutant generator is a unit within a simulation environment in charge of activating any of its mutants when the proper activation criteria are met, at which point it generates the corresponding mutant value and injects it into the circuit (as illustrated in FIG. 7). Therefore for each mutant generator, the collection of signals in the circuit that act as activation criteria to any of its mutants needs to propagate any change in value to this mutant generator. Also, whenever an activation criterion propagates into a mutant generator, the mutant generator needs to search through its set of mutants and identify every mutant that needs to be activated. When developing a mutant value generator, the effects of propagation complexity and activation complexity need to be taken into consideration. Propagation complexity can be defined as the number of extra mutant signal propagations per simulation iteration such that a mutant value generator is the target. Activation complexity can be defined as the number of mutants that need to be considered for activation upon a signal propagation into a mutant value generator. Propagation and activation complexity are illustrated in FIG. 8.

In one embodiment of the present invention, the system distributes mutant constructs using a centralized mutant generator. Only one unit in the simulation environment is in charge of generating mutant values. This results in the lowest propagation complexity because the propagation overhead imposed by concurrent mutant simulation is at most one extra propagation per internal signal. One effect of this approach can be that the modeled design error search space becomes linear with respect to the number of undetected mutants.

In one embodiment of the present invention, the system distributes mutant constructs using distributed mutant generators. One mutant value generator is assigned to each mutant construct. While this approach reduces the search space per mutant value generator to its minimum, it can also result in a maximum propagation complexity because the propagation overhead imposed by concurrent mutant simulation on a signal is typically proportional to the number of mutants to which it acts as activation criteria.

In one embodiment of the present invention, the system distributes mutant constructs using hybrid (clustered) mutant generators. Mutant constructs are "clustered" into groups that have common activation criteria, therefore maintaining the propagation complexity and activation complexity per mutant value generator at feasible levels.

In a verification system where multiple error models are being used, the hybrid mutant generation technique allows the flexibility of keeping mutants of disjoint activation criteria in separate clusters and allows the search function of each mutant value generator to be optimized by introducing a "partitioning" technique. Such partitioning schemes can reduce the search space per mutant generator by selecting the signal that acts as the most common activation criteria in that cluster and designating this signal as the partitioning point. Once a partitioning point has been chosen per cluster, each of these clusters can be organized as a hash table where the value of the partitioning point is used as the hashing key.

2.3.2. Clustering and Partitioning

High-level verification through the use of concurrent mutation-based simulation techniques typically provides the best input sequences when the set of mutants completely span the coverage measures. One reason for this is that concurrent simulation of a complete set of mutants allows an input sequence to drop all detected mutants, thus reducing the number of mutants for which subsequent input sequences need to be generated. A second reason is that aiming each ATVG iteration at detecting the maximal number of mutants results in a highly-effective input sequence with high probabilities of detecting complex design errors.

However, supplying a verification system with a complete mutant set can affect the simulation performance, because the simulator is forced to analyze a larger set of mutants per simulation iteration as it searches for all errors that need to be activated. One embodiment of the present invention reduces the complexity of the mutant activation cycle by reducing the technique's search space. Carefully organizing the data-structure that manages the live set of mutants can: (1) minimize the error-activation cycle, thus optimizing the simulation, and (2) give the ATVG system information on the distribution of undetected mutants among the design space, thus providing it with the ability to aim its mutant-activating efforts at the activation criteria with the highest density of undetected mutants. These benefits can be achieved by "clustering and partitioning" the complete set of mutant constructs into groups that are organized by their activation criteria.

Given that an underlying goal is to create partitions where the included mutants have at least one common signal in their activation criteria, one embodiment of the present invention can achieve clustering-and-partitioning by:

i. Generating a table where the rows represent the signals in the system that act as activating criteria to any of the mutants under consideration and the columns represent the set of mutants under consideration. For any mutant, the set of intersecting points specifies the set of signals that collectively denote that mutant's activation criteria. Initially, each of these signals and mutants are marked unselected.

ii. Identifying the unselected signal that intersects with the greatest number of unselected mutants, and marking this signal as selected.

iii. Grouping all unselected mutants that intersect with the selected signal into a cluster, and marking each of these mutants as selected.

iv. For this new cluster, setting the selected signal as the partitioning point and partitioning the cluster into a hash table where the activation criterion of the partitioning point is used as the hashing key.

v. If unselected mutants exist, returning to step (ii) to perform another iteration.

FIG. 9 illustrates an example of clustering and partitioning in which Si denotes a signal and $\alpha i$ denotes a mutant. In the example of FIG. 9, the first cluster includes the set of mutants $\{\alpha 1, \alpha 2, \alpha 3, \alpha 5\}$ with partitioning point S5, and the second cluster includes the set of mutants $\{\alpha 4, \alpha 6\}$ with partitioning point S4.

In practice, each possible value for the partitioning point typically has a nonempty set of corresponding mutants. For instance, consider a mutant construct, where an explicit state signal is chosen as the partitioning point. If the state signal occurs in every mutant construct, then selecting it as the partitioning point results in an efficient data structure when a processor's current state is used directly as the hash key. It is efficient because the performance of searching for the mutants to be activated remains independent of the size of the state-space. The only factors that would grow along with the state space are the hash table size and the total number of mutant constructs.

Figure 10:
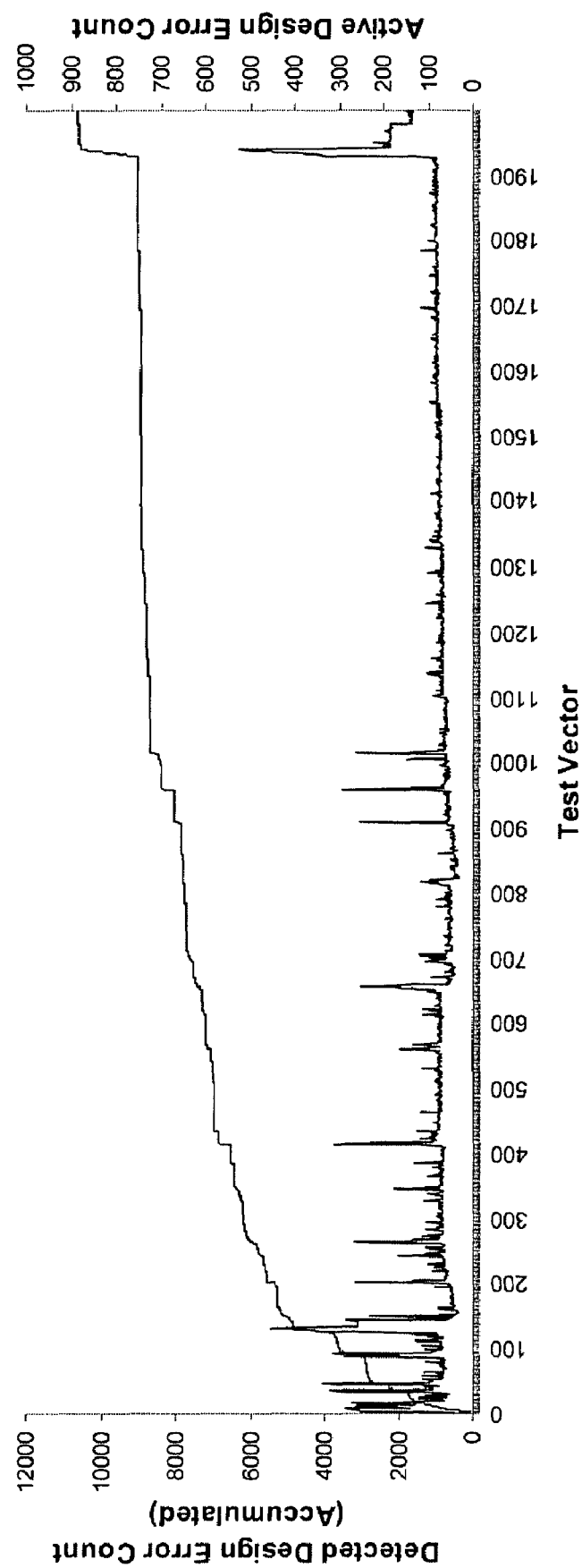
FIG. 10 illustrates a set of simulation results that result from using a modified MCE model in conjunction with an automatic mutant generation accordance with an embodiment of the present invention.

FIG. 10 illustrates a set of simulation results that result from using a control-based mutant construct in conjunction with an automatic mutant generator for a microprocessor design. The simulation results demonstrate a significant correlation between the number of mutants that are detected per simulation iteration and the number of mutants that are active per simulation iteration, and establish the benefit of focusing ATVG efforts on maintaining the number of active mutants at its highest possible value. Focusing ATVG efforts towards activating and propagating any mutant in the largest mutant partition can ensure an optimal mutant detection rate in a practical way. FIG. 10 also illustrates the difficulty in generating input stimuli to detect mutants given that a pseudo-random input sequence achieved to activate less than 0.2% of the mutants in the same design. This low activation rate is a result of two factors: i) many mutants are difficult to activate given they involve an architectural state deep within the circuit's FSM, ii) active mutants within a simulation don't live long given that they either quickly propagate to an observation point or are masked somewhere in the data path. This low activation rate for mutants and the strong correlation between the active and the detected mutants serve to justify the implementation of a concurrent mutant simulator because the simulation overhead imposed by active mutants is guaranteed to maintain low, and the value it provides is high by helping to visualize the effectiveness of an input sequence.

Note that random and pseudo-random ATVG tend to provide coverage in bursts. The detection rate for the random ATVG sequence of FIG. 10 appears to reach an upper asymptote after surpassing input vector no. 1050, which could be interpreted by a verification engineer to signify that the verification efforts could be terminated at this point due to a diminishing return on coverage per extra input vector. However, it typically is a mistake to assume a randomly generated instruction sequence will always produce an optimal curve, and early termination of a verification effort can risk not exposing important design errors that may have been exposed by a later productivity burst (such as the burst after input vector no. 1900 in FIG. 10). Such sudden bursts of productivity in the verification phase are a common phenomenon that plagues the circuit design industry. Commonly, design teams become convinced that their design is close to being fabrication-ready whenever subsequent verification iterations continue to expose less important bugs, only to have a later verification iteration expose a large dose of important bugs. If this large dose of important bugs could have been stimulated and catalogued at some earlier verification iteration, it could have been fixed earlier and involved fewer time-consuming verification iterations.

2.4. High-Level Circuit Analysis

Once a set of mutants has been generated, the system simulates them on the hardware description under verification to utilize the input sequence and track its effectiveness. The techniques in the previous sections include an efficient method for simulating a collection of mutants concurrently on an RTL circuit. Now, to promote an effective verification platform, the system needs a systematic ATVG strategy that can satisfy the simultaneous constraints specified by any mutant. To achieve this, the system first needs to convert the set of simultaneous constraints into a solution space. This solution space lists all target architectural states that can satisfy all simultaneous constraints, and any of these target architectural states can be used as the starting point when generating an instruction sequence.

It is important to identify the complete set of few target architectural states, because doing so prunes out the many irrelevant architectural states. Given that only one of these target architectural states is necessary, the system denotes each target architectural state in the solution space as a prospect state (pState). Each pState is defined by: (i) the events that satisfy the simultaneous constraints, and (ii) the control requirements that allow these data dependencies to materialize. Each of these two components of a pState is implemented using a type of constraint dependency graph (CDG).

2.4.1. Constraint Dependency Graphs 2.4.1.1. Representing a Range of Values

Discrete and real data types can easily be represented as a value range, given that their range can be explicitly defined by a minimum and a maximum value. Bit-vector literals, however, are more difficult to represent. A partially-defined bit-vector can be represented as an array of bits, such that each bit can have a value of zero (0), one (1), or don't-care (x). An x value signifies that the corresponding bit can be used either as a '0' or a '1'. As a result, the system can reduce the number of bit-vectors needed to represent a given set of values by merging pairs of bit-vectors that differ by only one bit into a partially-defined bit-vector. Thus a range of values exists as a set of partially-defined bit-vectors.

Such a partially-defined bit-vector set can be stored as a tertiary search tree, such that each insertion attempts to reduce the tree by removing bit-vectors that are masked by the inserting bit-vector, or by merging the inserting bit-vector with another bit-vector that has at most one corresponding bit with an inverted value. Whenever merging is needed, the bit-vector in the tree that initiates the merge is removed, and a new insertion operation is performed with the merged bit-vector as the operand.

Hardware description languages allow performing relational and addition operations between bit-vector types and integer types. As a result, we need a method to convert an integer value range into a partially-defined bit-vector set. To do this, we can develop a method to generate a partially-defined bit-vector set which enforces a minimum or a maximum. Consequently, we can generate a partially-defined bit-vector set which enforces an integer value range by generating them for the minimum and the maximum separately, and then intersecting both sets to generate a partially-defined bit-vector set that forms an intersection between both sets.

To generate a partially-defined bit-vector set for the minimum, we begin by replacing all '0' bits with an 'x' and insert a copy of this bit-vector into the new set. From here on, while there is a sequence of '1's (starting with the least-significant bit) that is followed by at least one 'x': replace this sequence of '1's by 'x's, replace the succeeding 'x' with a '1', and insert a copy of this bit-vector into the set. The final insertion is a bit-vector in the form of a series of 'x's that is appended by a series of '1's. Similarly, to generate a partially-defined bit-vector set for the maximum, we begin by replacing all '1' bits with an 'x' and insert a copy of this bit-vector into the new set. From here on, while there is a sequence of '0's (starting with the least-significant bit) that is followed by at least one 'x': replace this sequence of '0's by 'x's, replace the succeeding 'x' with a '0', and insert a copy of this bit-vector into the set. The final insertion is a bit-vector in the form of a series of 'x's that is appended by a series of '0's. An example where a partially-defined bit-vector set is generated from an integer range is shown in FIG. 11.

An ordinary bitwise operation is easily performed across partially defined bit-vector sets by applying the operation onto all pairs of partially-defined bit-vectors from both sets. This process can generate a large number of partially-defined bit-vectors, but this set is usually reduced substantially after it is inserted into the tertiary search tree.

Implementing arithmetic operations on partially defined bit-vectors can be a difficult aspect of developing support for partially-defined bit-vectors. Consider the truth table for a single-bit adder illustrated in FIG. 12. In FIG. 12, scenarios V, VI, and IX provide alternative outputs that cannot be represented in a single partially-defined bit-vector. It is therefore necessary to "split" the addition operation under these scenarios into two independent addition operations, such that each independent addition operation produces its own solution in the form of a partially-defined bit-vector. At the end of the addition operation, all the individual partially-defined bit-vectors will have been inserted into the same tertiary search tree, and therefore the set is once again reduced by the insertion process. Other arithmetic operations, such as negation and subtraction, can be implemented using the addition operator.

2.4.1.2. Solving a CDG

Note that CDG structures can vary, and that some structures are easier to solve than others. Given that we are representing possible solutions by using range information, the system may be configured to avoid operators that impose solutions with multiple disjoint ranges in values. An example of such an operator is the inequality operator. A statement A/=B returns a true Boolean value if A<B or A>B, therefore doubling the number of explicit value ranges. Let us define such operators as "disjoining" operators. Instead of solving a CDG by transferring multiple value ranges across CDG operators as a result of disjoining operators, we can restructure a CDG into an equivalent graph that does not contain these disjoining operators.

In one embodiment of the present invention, the system avoids the set of disjoining operators illustrated in FIG. 13 in CDG representations, and instead uses the replacement statements shown. In this restructured CDG representation, the system may also make an explicit distinction between Boolean operators and bitwise operators, because they produce distinct disjoining effects when taking a (two) value range(s) as their operand(s). As an example, a Boolean NOT operator applied to an equality operator will double the number of explicit value ranges as previously stated, while a bitwise NOT operator applied onto a literal will simply invert every bit in its operand. Notice from FIG. 13 that Boolean not operators are removed from CDGs, however bitwise not operators are retained.

Figure 14:
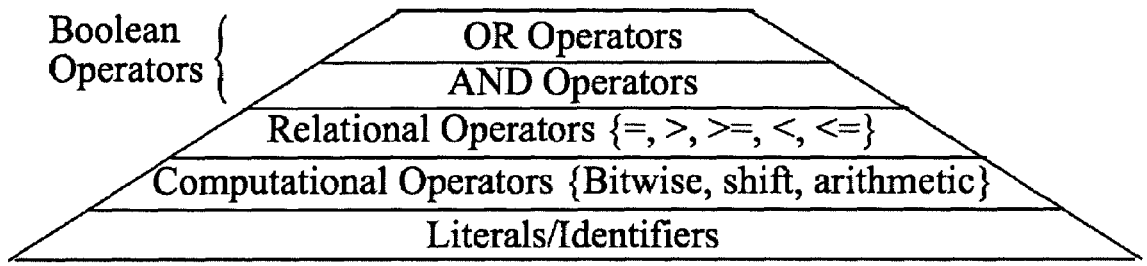
FIG. 14 illustrates an operator hierarchy for a CDG structure in accordance with an embodiment of the present invention.

Note also that in the restructured CDG representation, only one disjoining operator that remains in the CDG structure as it binds all disjoint range of values into a set. The Boolean OR operator is used to reference the CDG structures that define a specific explicit value range, and a set of these CDG structures is linked by a tree of Boolean OR operators. As a result, we get a CDG structure in the form of a disjunction of conjunctions, such that each conjunction defines a specific explicit range in values for its identifiers. More specifically, all nodes in a conjunction share the range in values for the variables and signals they refer to. The nodes in our restructured CDG follow a hierarchy (shown in FIG. 14). The Boolean OR and Boolean AND operators are propagated towards the first and second layers in the CDG, respectively, via DeMorgan's Theorem.

2.4.2. Search-Space Optimizations for Solving CDGs

Because pStates are generated and solved throughout the ATVG process to justify a set of constraints past one time frame, the techniques for restructuring and solving CDGs may often be MVP's limiting factor. Hence, runtime performance can be improved by optimizing the worst-case scenario for the techniques that restructure and solve CDGs. Case statements are commonly used in hardware descriptions to describe the control space of an FSM. Therefore, it is expected that some case statements in a hardware description will be significantly large. Also, it is expected that some signals (in particular, control signals) will have a separate assignment statement within each block of the case statement. These large case statements can sometimes be the limiting factor for MVP's performance, because such a signal will need the corresponding assignment statement and control requirements to be analyzed for every block in the case statement.

If a case statement contains a "when others" block, its control requirements (guard) will be the conjunction of the negated guards of all explicit cases. This block's control requirements will therefore be a conjunction of disjoining operators, where a disjoining operator is an operator that imposes a disjoint range of values onto any identifier operand. To convert this graph into a disjunction of conjunctions such that each conjunction defines a contiguous range of values for all discrete identifiers within it, we need to restructure the CDG into an equivalent graph that is free of disjoining operators.

Restructuring the graph into our desired form involves recursively replacing each sub-tree rooted at a disjoining operator with an equivalent tree that is free of disjoining operators, but is bigger in size. An inequality operator is replaced by a disjunction of relational operators, which unfortunately is a complete tree with twice the number of leaf nodes than the original. The size complexity is exacerbated by the modified graph's conjunction of disjunctions structure. Performing a brute-force restructuring process to convert this graph into a disjunction of conjunctions through the use of DeMorgan's Theorem produces a graph that is exponential in size in terms of the number of disjoining operators. This size complexity may quickly becomes a burden, because restructuring involves an exponential runtime complexity, and soon thereafter becomes a limitation because it may easily consume all available memory.

Figure 15:
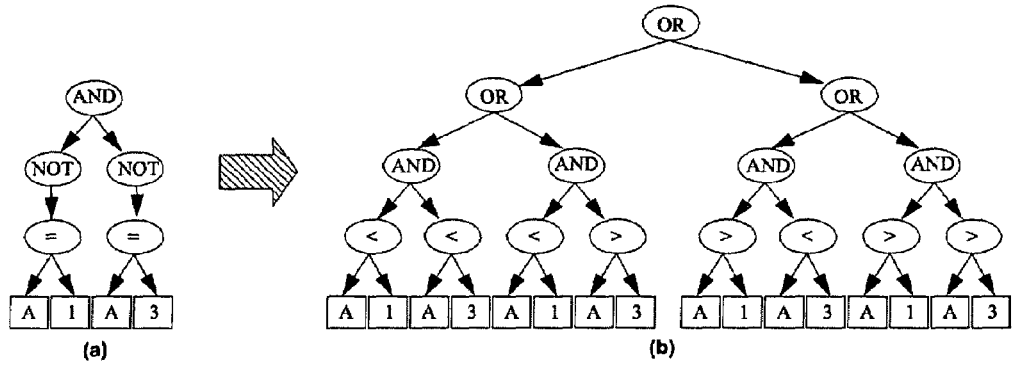
FIG. 15 illustrates a sample CDG after an un-optimized restructure in accordance with an embodiment of the present invention.

FIG. 15 illustrates an example CDG produced by the "when others" block of a case statement for signal A, such that the guards for the case statement's two explicit cases are: (i) "when 1" and (ii) "when 3". FIG. 15 area (b) illustrates the restructured CDG (with no optimization) using the method described earlier. The next step is to estimate the size of the restructured CDG that represents the control requirements for the "when others" block of a case statement with n explicit cases.

For a case statement with n explicit cases, the "when others" block will have a guard that is a conjunction of n inequality operators. Each inequality operator is replaced as follows: $(A \neq B) \Rightarrow ((A<B) \text{ OR } (A>B))$. So a conjunction of n inequality operators will be a conjunction of disjunctions, and each disjunction will have 2 operators. An example of this conjunction of disjunctions is $((A<1) \text{ OR } (A>1)) \text{ AND } ((A<3) \text{ OR } (A>3)) \text{ AND } ((A<4) \text{ OR } (A>4))$.

Figure 19:
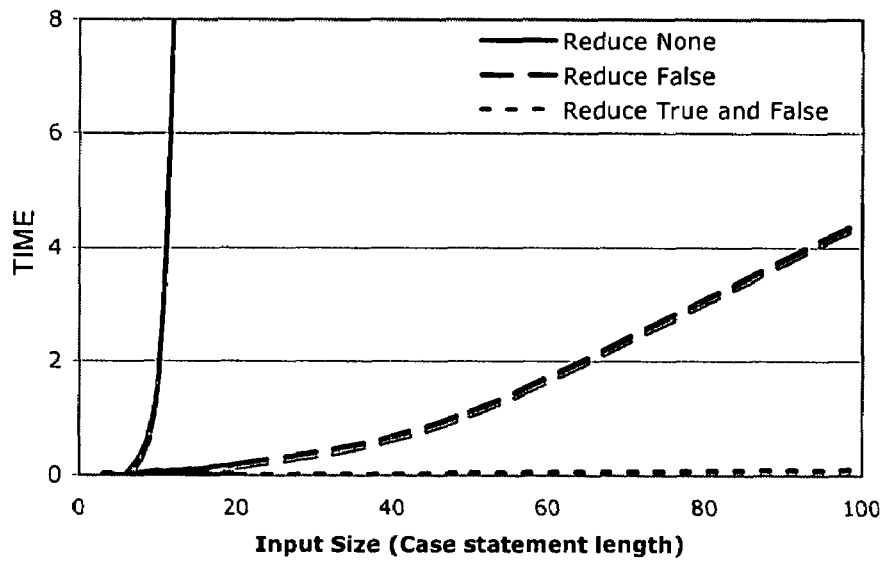
FIG. 19 illustrates sample CDG optimization results in accordance with an embodiment of the present invention.

Next, DeMorgan's Theorem is performed to propagate the OR operators above the AND operators starting at the end of the tree. The operators in each disjunction will typically be duplicated many times as they are being placed into conjunctions (distributive property). Every conjunction in the final tree will have one relational operator from each original disjunction, and hence, each conjunction will have n operators. In order to determine how many operators there are in the final tree, we need to determine the number of final conjunctions; in other words, how many combinations we can have such that exactly one relational operator is taken from each original disjunction (either > or <). For each original disjunction, there are 2 choices, and since there are n original disjunctions, then there are $2^n$ possible combinations. With $2^n$ conjunctions in the final tree and each conjunction having n operators, there are $n \times 2^n$ operators. Each operator has 2 leaves, so there are $n \times 2^{n+1}$ leaves. Since a complete tree with k leaves has $(2k-1)$ nodes and since the OR-AND part of the CDG is a complete tree, then the overall CDG has a total of $(3n+2) \times 2^n - 1$ nodes. FIG. 19 shows the exponential runtime of the solver due to the brute-force restructuring process discussed in this section, under the line labeled Reduce None.

2.4.3. Selected Optimizations for Solving CDGs 2.4.3.1. Unconditionally False Sub-Trees In one embodiment of the present invention, some CDG sub-trees can be removed early in the restructuring process because they evaluate to false. These unconditionally false sub-trees can be identified by attempting to force a Boolean true value onto any Boolean operator or relational operator. A sub-tree will only be able to satisfy the true value if the range of values imposed onto all identifiers at that sub-tree intersects with the range of values imposed on corresponding identifiers at all other sub-trees of the same conjunction. These operators will return a value of SUCCESS if successful, and will return a value of FAIL otherwise.

Figure 16:
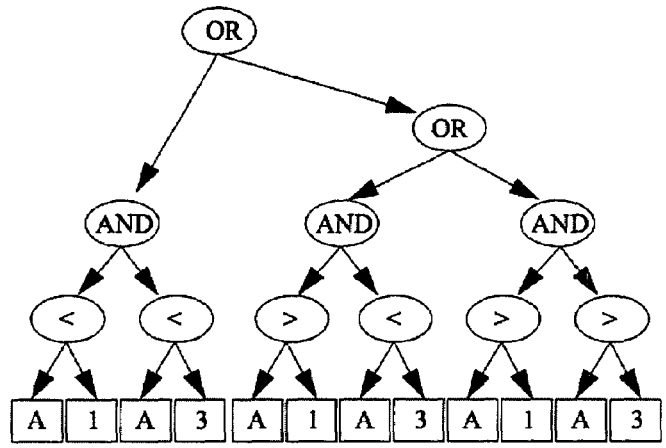
FIG. 16 illustrates a sample CDG after simple reduction in accordance with an embodiment of the present invention.

Applying DeMorgan's Theorem to propagate a Boolean OR operator above a Boolean AND operator begins with a CDG sub-tree rooted at a Boolean AND operator and results in an equivalent sub-tree that is rooted at a Boolean OR operator. In order to optimize restructuring a CDG, we had the Boolean AND operator perform a reduce( ) operation on the sub-tree rooted at the Boolean OR operator that was generated by applying DeMorgan's Theorem. This reduce( ) operation recursively travels down to all relational operators and attempts to force a true value onto these operators. It replaces any of these relational operators with a Boolean false literal if a FAIL value is received in return. The reduce( ) function reduces Boolean AND and Boolean OR nodes that are connected to a Boolean literal (an unconditional value) accordingly as it recursively returns back to the node it was called on. This optimization effectively reduces the size complexity of the restructure process. FIG. 16 depicts the graph of FIG. 15 after it is restructured using this optimized function. This optimization can make the runtime complexity of the restructure process feasible, as it allows pStates for most common constraints to be solved much more quickly.

However, a complex data dependency on a constraint will identify a series of signals whose value may depend on the circuit's architectural state. Such a data dependency may force the ATVG unit to analyze the same control requirements a series of times, once for each identified signal. If all of these identified signals are dependent on a large explicit FSM, the large case statement that implements the FSM can be analyzed a series of times. This can multiply the computation time demonstrated by the second graph of FIG. 19 (labeled Reduce False), and may render the runtime complexity of the restructure operation to be unacceptable.

2.4.3.2. Unconditionally True Sub-Trees

One embodiment of the present invention further optimizes the restructuring technique by detecting and removing early in the restructuring process sub-trees that evaluate to true. Such unconditionally true sub-trees can occur when a comparison on an identifier does not reduce the range of values imposed on that identifier. FIG. 17 illustrates the additional reduced graph that results for the example from FIG. 15.

Enabling a reduce( ) operation to identify sub-trees that are unconditionally true can involve modifying a dyadic operator's method of solving its sub-tree. Now, a sub-tree returns EXPENDABLE if it is unconditionally true, returns FAIL if it is unconditionally false, and returns SUCCESS otherwise. An operator is EXPENDABLE if its child(ren) is(are) expendable, returns SUCCESS if no data contradiction is encountered, and returns FAIL otherwise. An identifier is EXPENDABLE if the range of values imposed onto it encapsulates the range of values imposed onto the same identifier at a different sub-tree of the same conjunction, returns SUCCESS if the range of values imposed onto it intersect the range of values imposed onto the same identifier at a different sub-tree of the same conjunction, and returns FAIL otherwise. Similarly, a literal returns EXPENDABLE if the range of values imposed onto it matches its value exactly, and returns FAIL otherwise. FIG. 18 illustrates how a relational operator can be reduced based on whether it is unconditionally true or unconditionally false.

2.4.3.3. Optimization Results

The optimizations discussed above effectively reduce the size complexity and runtime complexity of the restructure process. FIG. 19 illustrates a set of sample CDG optimization results for the graph of FIG. 15 after it has been restructured using the optimized reduce( ) function.

Performing the reduce( ) operation during the restructuring process results in two significant advantages. First, it allows a pState to be solved efficiently. Second, a pState's implications on the circuit's set of internal signals and primary inputs will have been identified once the restructure process terminates. As was mentioned earlier, the restructure process calls the reduce( ) function on a sub-tree that was modified via DeMorgan's Theorem. It does this as a way to reduce this sub-tree before it performs DeMorgan's Theorem at higher levels in the graph (and thus, propagating the OR operators to the top of the tree). Calling reduce( ) can have the productive side-effect of forcing all conjunctions within that sub-tree to identify the range of values for all identifiers within it. This optimizes the solver because sub-trees are solved and reduced when they are small, and conjunctions that are joined into a greater conjunction via DeMorgan's Theorem can have any data contradictions immediately exposed based on each sub-graph's previously solved range in values.

2.4.4. Generating a Prospect Code Path

As previously mentioned, an activation criteria denotes a collection of signal instantiations and a corresponding set of values that these signals satisfy. These activation criteria are used as the initial set of ATVG goals. Before attempting to identify the sets of implications that satisfy the ATVG goals, the search space can be reduced by first identifying, for each ATVG goal, the basic blocks that can assign the desired value onto the appropriate signal. For each of these identified basic blocks, the system can extract the guards (conditions from condition statements) that allow this block to be reached and combine the identified guard constraints to form the set of control requirements. A prospect code path is defined as one of the many assignment statements that may be able to satisfy an ATVG goal's constraint, such that the assignment statement can be reached when the identified control requirements are satisfied. A prospect code path for an ATVG goal includes: (i) the constraints to be satisfied, (ii) an RTL assignment statement that can satisfy the constraint, and (iii) the control requirements that allow its corresponding assignment statement to be reached. A prospect code path can be conceptualized as one of many possible high-level cones of logic (local to a module) for a given signal or variable. Note that generating a prospect code path for an ATVG goal is performed independently of all other prospect code path generations for other goals, and need only consider the scope of the module in which the ATVG goal exists.

Figure 20:
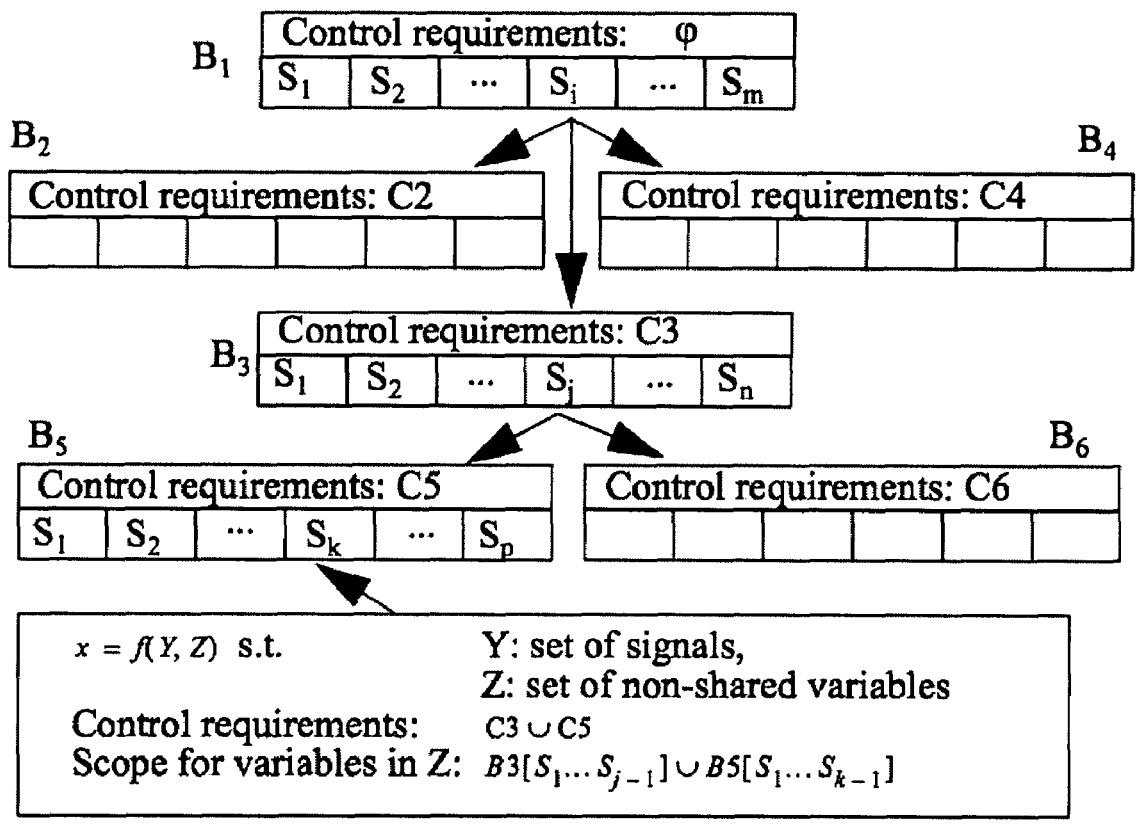
FIG. 20 illustrates a statement tree of nested condition statements in accordance with an embodiment of the present invention.

In one embodiment of the present invention, the system implements the environment that extracts the prospect code paths for a given module by creating a statement tree (illustrated in FIG. 20) that preserves the structural integrity of all statements in the module and is able to provide an absolute path and control requirements to a given statement. Such a tree can be implemented by a collection of StatementList nodes that each includes a series of statements and the control requirements that allow these statements to be reached. The root level only includes the concurrent items in the module, and thus does not impose any control requirements. Any of these concurrent items can be a statement outside of process declarations, or they can be a process declaration. All other levels include sequential items. A process is created into a sequential node by inserting all statements in the order in which they appear, such that a child StatementList node is created for any nested condition statements and a link to it is inserted in its place. Conditional assignment statements that exist outside of a process can themselves be converted into a process for their implementation, which allows the prospect code path for such a statement to be extracted in the same way as an assignment statement in a process.

A process can be spawned to convert an assignment statement into a prospect code path as follows: If the statement references a non-shared variable, then the scope of this variable is expanded by inserting the previous assignment statement to that variable within the current code path. Shared variables are typically not supported because of their nondeterministic behavior when multiple processes modify the same shared variable at the same simulation iteration. If the statement includes an internal signal, then the scope of this signal is expanded by inserting any assignment statement to it. There may be numerous assignment statements whose control requirements do not conflict with those of a selected prospect code path, so a new prospect code path needs to be generated for each of these alternatives.

The microprocessor program segment illustrated in FIG. 21 updates the value to a program counter (pc) register. This is the only location in the microprocessor implementation where the PC register is written to, and the initial CDG generated for the signal pc is illustrated in FIG. 22. Note that temppc and tempof are both variables, and that the assignment statement to signal pc lies at the end of the process. Therefore, when generating the CDGs for an ATVG goal on signal pc, any assignment to temppc and any assignment to tempof earlier in the process may be used as long as their control requirements do not conflict. The complete set of prospect code paths for an assignment to signal pc is generated and the resulting eight CDGs are illustrated shown in FIG. 23.

Figure 23:
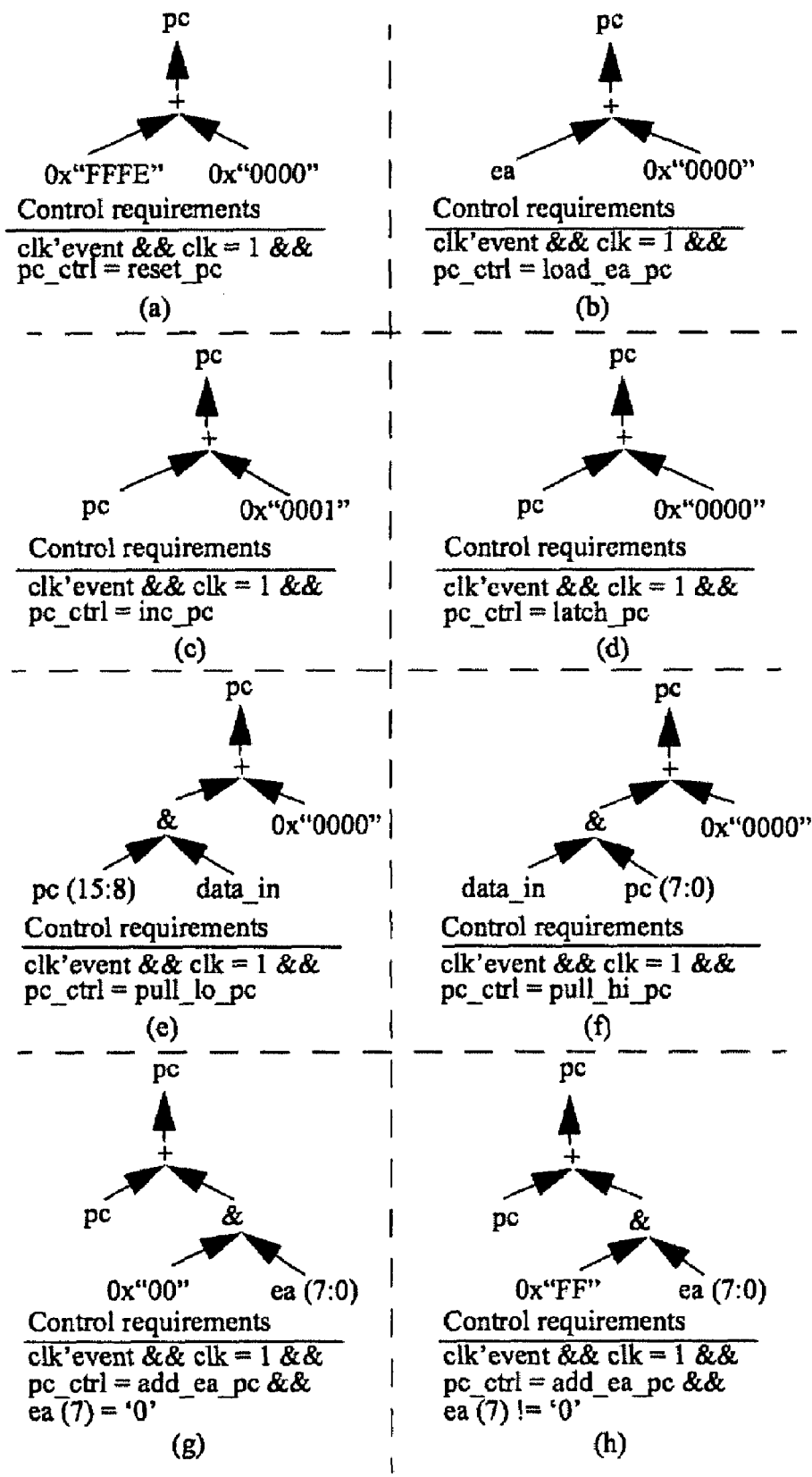
FIG. 23 illustrates possible CDGs for an ATVG goal on signal pc in accordance with an embodiment of the present invention.

The leaf nodes of all the CDGs in FIG. 23 are constants, signals corresponding to registers, or primary input signals. Any of the prospect code paths deduced from these eight CDGs may be used to satisfy the ATVG goal on signal pc, but some choices are better than others. Inspection can be used to determine that CDGs (e) and (f) in FIG. 23 may be used in sequence to effectively satisfy a constraint on signal pc, primarily because they have access to primary input signals. These eight CDGs represent the first step towards satisfying a constraint on signal pc because the control requirements still denote dependencies on internal signals (i.e., the pc_ctrl control signal). FIG. 24 illustrates a pictorial description for a prospect code path from an arbitrary statement $\alpha<=\beta$ when the condition $\gamma$ is satisfied.

2.4.5. Generating Prospect States

At this point, the system has for each constraint a collection of prospect code paths that are capable of performing the desired signal assignment. Each of these code paths has a collection of control constraints that need to be satisfied in order for the corresponding assignment statement to be reached. It is possible to narrow down the search space into a collection of target microprocessor states that can possibly satisfy the complete set of constraints. A prospect state (pState) can be defined as an architectural state that can satisfy a given set of simultaneous constraints. It can be conceptualized as one of many possible high-level cones of logic that satisfies a set of constraints across module boundaries. A set of pStates can be generated by cross-referencing the sets of control requirements for all ATVG goals to identify all combinations of prospect code paths that can satisfy the ATVG goals without resulting in a contradiction between control requirements.

Mutants will typically have multiple constraints as their activation criteria that need be satisfied simultaneously. The set of constraints can reside in distinct module instantiations within the circuit implementation, but each of the prospect code paths has a scope that does not reach past its module instantiation. Each pState serves as a specific focal point for the constraint solver such that every constraint's relation to the set of internal signals and primary inputs are directly specified by a unified CDG. It has been previously stated in this section that each module instantiation includes a statement tree and references to all its embedded modules. Therefore the collection of pStates can be generated as follows: Each module instantiation is responsible for creating a prospect code path for every constraint that resides inside itself. It is also responsible for generating the complete set of pStates from the set of prospect code paths that reside inside itself; these pStates have a domain that does not surpass its module's scope.

Each module instantiation uses the pStates it receives from its children to generate the pStates at its level of scope. When a module instantiation receives a pState from any of its children, it will first replace the child module's primary input (PI) signals with the corresponding local signals as specified by the port map. Then it will continue to expand the scope of the internal signals in the pState until all signal references reach its primary inputs or any register; a process substantially similar to the generation of prospect code paths described previously. After this, it creates a cross-product of the pStates from its child with its own (if any exist) into an expanded set of pStates. It does this by merging the data dependencies and control requirements from all its local pStates with those of all its child's pStates to generate all acceptable merges. Once it merges its local pStates with those of all its children, each of these pStates encompass all constraints that lie at or below this point in the module hierarchy.

In one embodiment of the present invention, pState generation is optimized through concurrent programming. Each prospect code path can be generated by an independent thread because they are independent of all other prospect code paths by definition. Furthermore, the creation of pStates local to a nested module can be implemented by having each process that generates a prospect code path transfer control into a merge( ) operation local to its module. This merge( ) operation will merge the prospect code path into its local node such that the local partial pStates are accessed through mutual exclusion. Once the final merge( ) operation of a nested module has finished executing, it will transfer control to the parent module through the use of that module's merge( ) operation.

2.5. High-Level ATVG

Previous sections described MVP's mutation-based simulation strategy that provides valuable coverage analysis in real-time. Given a coverage metric that has been instantiated through a complete collection of mutants, MVP's concurrent mutant simulation system can efficiently keep track of the effects imposed onto the circuit by millions of these mutants. For the sake of progress, these mutants are removed from the simulation once they are propagated to any pre-designated observation point. When this happens, the mutant has been "killed." Through this simulation system, the objective becomes to expose and kill as many of these mutants as possible, because the outcome is an input sequence that has a proven high coverage of the circuit under verification. The described simulation strategy is enhanced by the use of the efficient and effective constraint solver, which is made up of a set of deterministic circuit analysis methods.

In one embodiment of the present invention, the system exploits MVP's simulation and circuit analysis abilities to generate an input sequence that exposes an optimal set of mutants after every ATVG iteration. The system extracts ATVG goals from simulation statistics to expose an effective set of mutants, and then efficiently navigates through a circuit's finite state machine (FSM) to satisfy the ATVG goals.

2.5.1 Identifying the Most Effective ATVG Goals

In one embodiment of the present invention, the system takes advantage of the previously-described clustering-and-partitioning data structure by using an ATVG technique that gives priority to any partition whose activating input sequence has the possibility of stimulating the most mutants. This technique focuses ATVG efforts on maintaining the number of active mutants at its highest possible value, which correlates to generating an input sequence for the partition with the greatest number of undetected mutants.

FIG. 25 illustrates pseudocode describing the steps in each ATVG iteration. These steps aim MVP's ATVG efforts at the activation criteria with the highest density of undetected mutants (deterministic-activation), and only performs deterministic-propagation in the case where probabilistic-propagation is insufficiently effective. Line 1 sorts the list of partitions into the order of descending member size to ensure that any unsuccessful attempt to generate an input stimuli for a partition P is followed by an attempt on the next best partition during the subsequent iteration of the while loop. Line 6 attempts to generate an input sequence that activates an inactive mutant in P, and any failed attempt results in the removal of that mutant from P (fault dropping). These dropped mutants are marked as unexcitable. Line 10 handles the case where the activation criteria for the partition P are already met, which is expected to happen whenever probabilistic propagation on the set of active mutants from P is insufficiently effective. Therefore line 10 is used to generate an input sequence that propagates an active mutant in P to a primary output, and any failed attempt results in the removal of that mutant from P. These dropped design errors are marked as undetectable.

At the start of the ATVG effort, deterministic activation on the dominant partition detects enough mutants from this partition so as to demote it from its dominant status. The probabilistic-propagation technique continues to be effective for as long as there are enough mutants with simple propagation requirements. Whenever the ATVG-ITERATION technique encounters a partition that has an insufficient number of mutants with simple propagation requirements, the deterministic activation iteration can be followed by a deterministic propagation iteration on the same dominant partition.

2.5.2. FSM Analysis in Input Sequence Generation

In one embodiment of the present invention, a control-based coverage metric can be generalized so that an identifier is only dependent on a subset of a microprocessor's internal registers. This allows an RTL implementation to be decomposed into a set of interacting FSMs, such that one FSM is generated per internal register. Given a set of simultaneous constraints, a corresponding pState can be used to identify the set of registers (and their corresponding target values) that help satisfy these constraints. Thus, the final step in automatic test vector generation traces the target values for these registers to the reset state by analyzing their corresponding FSMs.

Analyzing the solution space for multiple simultaneous FSMs is substantially similar to the problem of analyzing the solution space for multiple simultaneous constraints, such that contradictions cannot exist in the control values of the solution space. For multiple simultaneous FSMs, the control values that define the state transition of one FSM cannot contradict the control values that define the state transition for any other FSM in the same time frame. Even though this inter-dependency between FSMs does complicate the ATVG problem, it can be exploited to identify contradictions early in the search process, substantially similar to the generation of a pState.

Finite state machines can be implemented as a directed graph, such that each state transition can be represented by a function $y=\delta(s, x)$. In this function, y represents the next state, s represents the current state, and x represents the input to the FSM. By using pStates, we can convert a set of simultaneous constraints to a target state y', and we can identify the internal signal values s and primary input values x that allow y' to be reached. This allows us to generate an input sequence by stepping backwards in time starting at y'. All FSM graph edges have equal weight, thus we are limited to employing either a depth-first-search (DFS) or a breadth-first-search (BFS) technique when generating an input sequence for a single FSM that maps some target state y' to the current state s'. A BFS technique guarantees to provide the shortest input sequence, but typically involves using a significant amount of extra memory to store all pending paths being searched as multiple paths are explored simultaneously. Therefore a simple starting point can try to implement the FSM search technique using a DFS technique, such a maximum path length l is specified to eliminate lengthy solutions and limit the search space.

Figures 26, 27:
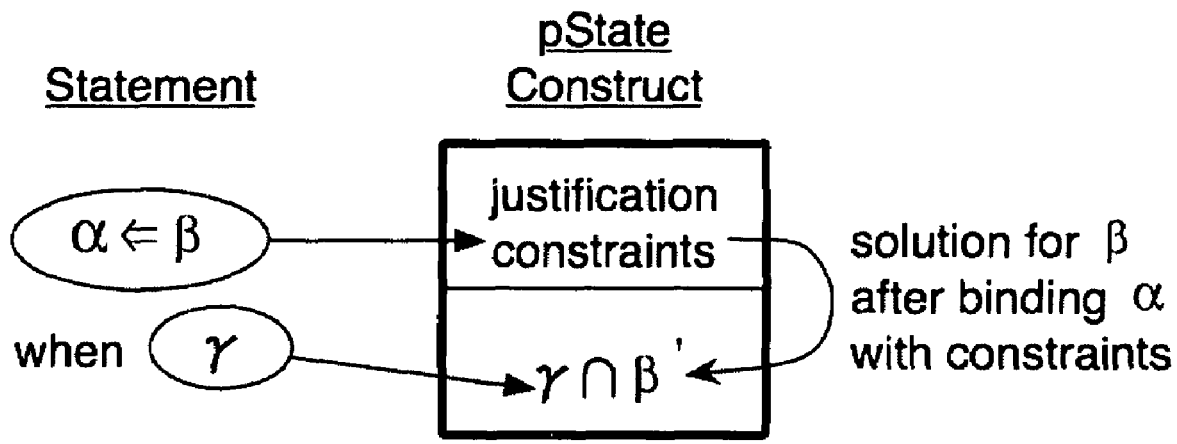
FIG. 26 illustrates pseudocode describing a set of steps used in a DFS technique used for each ATVG iteration in accordance with an embodiment of the present invention.
FIG. 27 illustrates satisfying a pState's justification constraint in accordance with an embodiment of the present invention.

This DFS technique can be adapted to support multiple simultaneous FSMs, as shown in the pseudocode illustrated in FIG. 26. In FIG. 26, TS holds the input sequence that will be returned, Y holds the constraints to be satisfied (target state), S returns the control requirements that satisfy Y (previous state to Y), and l is the size limit to the instruction sequence. This multi-FSM DFS function gives us the advantage of only searching the relevant portion of a microprocessor's FSM, as it allows an input sequence to be generated using a subset of the microprocessor's internal signals. This technique continues to satisfy the target constraints in Y until Y=Ø, identifying the constraints that define the previous state S in the process.

Each target constraint in Y is satisfied by a statement in the HDL code as depicted in FIG. 27. The constraint, γ, is first inserted into the pState's guard CDG to ensure that the statement is a possible triggered event. If the guard's CDG has not evaluated to false, then the statement is inserted into the pState as follows. First, the target identifier, α, is bound with the justification constraints (events CDG in the pState) to attain the corresponding constraint's value. After which, the statement's CDG is solved to allow the identifiers in β to attain the possible solutions that allow α to satisfy the constraint. After the statement's CDG is solved, the solutions to β are inserted into the guards that denote the next justification problem. Satisfying a propagation constraint follows a substantially similar process, except the information flow travels from the guards towards the events as is done during normal circuit simulation.

Figure 28:
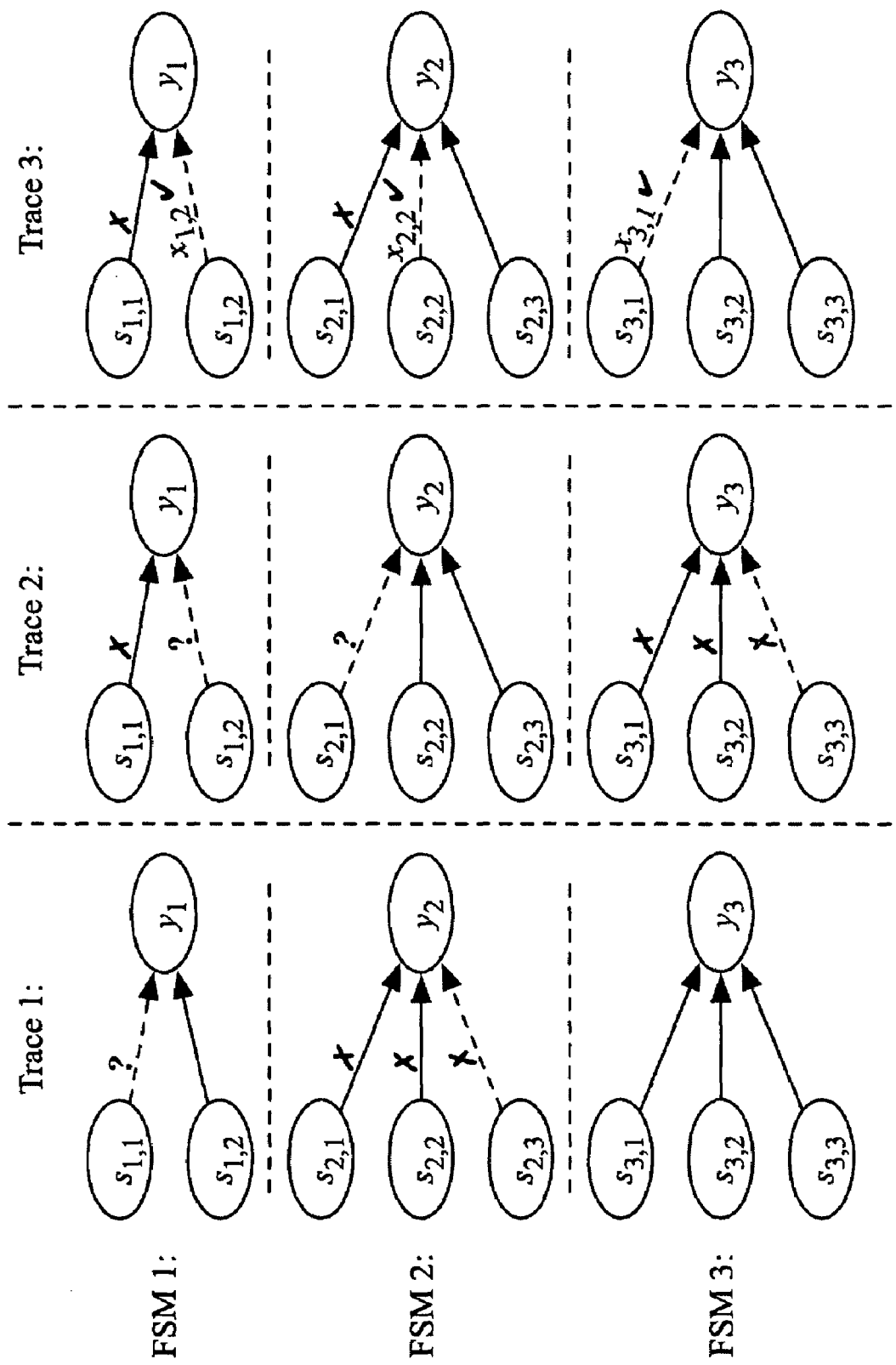
FIG. 28 illustrates a single time-frame example for a multi-FSM DFS function in accordance with an embodiment of the present invention.

In a single time frame, an example scenario for the multi-FSM DFS function would look as depicted in FIG. 28. In this example, there are three target registers $\{R_1, R_2, R_3\}$ and three corresponding target values $\{y_1, y_2, y_3\}$. The objective is to find an incoming transition for each corresponding FSM $\{\delta(s_1, x_1), \delta(s_2, x_2), \delta(s_3, x_3)\}$ such that the control requirements for each transition do not contradict one another $(x_1 \cap x_2 \cap x_3 \neq \emptyset)$. After backtracking six times in this example, a final solution set $\{\delta(s_{1,2}, x_{1,2}), \delta(s_{2,2}, x_{2,2}), \delta(s_{3,1}, x_{3,1})\}$ is found. This portion of the technique is implemented in lines 3-11 of FIG. 26. The FOR loop of line 5 continues to explore all possible incoming transitions for constraint v until a solution is generated, a data conflict is exposed, or the search space has been exhausted.

Figure 29:
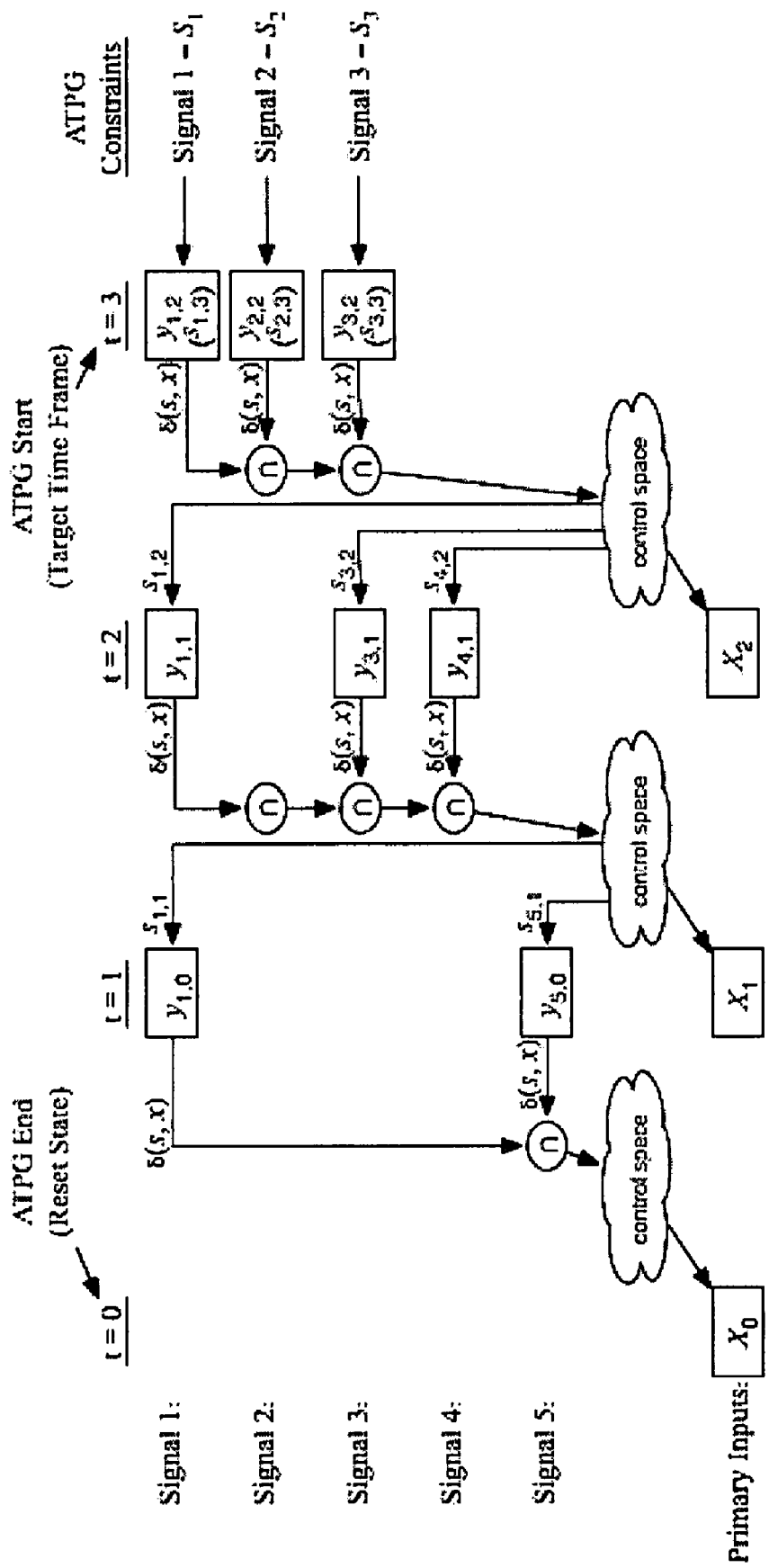
FIG. 29 illustrates a multiple time-frame example for a multi-FSM DFS function in accordance with an embodiment of the present invention.

Analyzing the multi-FSM DFS function across multiple time frames, an example scenario would look as depicted in FIG. 29. In this example, we begin from the right with two signal constraints $\{Sig_\alpha = y_\alpha, Sig_\beta = y_\beta\}$ whose data dependency is mapped to three internal signals or registers $\{R_1 = y_1, R_2 = y_2, R_3 = y_3\}$ by a specific pState. From here on, the multi-FSM DFS function identifies for each register an incoming transition that is compatible with all other registers' incoming transitions, such that all transition information ($\delta(s, x)$ (in FIG. 29) is combined to define the control space (S, in FIG. 26) for that specific time frame. This control space includes a set of register values and primary input values, and thus defines the state space for the previous time frame.

At some intermediate time frames, the control space will introduce a dependency on a new register (i.e. introduction of $R_4 @ t=2, R_5 @ t=1$ in FIG. 29) whose FSM will also need to be analyzed. Similarly at some other time frames, this control space will no longer denote a dependency on a specific register (i.e. absence of $R_3 @ t=0$ in FIG. 29); this can happen at time frames when a data register is assigned the needed data value. Once the current architectural state is reached, the recursive multi-FSM DFS function reports the primary input values in chronological order as it returns; reporting a input sequence $\{X_0, X_1, X_2\}$ in the case of FIG. 29.

2.5.3. Generating an Input Sequence Using Prospect States

Careful analysis of the multi-FSM DFS function of FIG. 26 reveals that lines 3-11 simply map a constraint set Y to any constraint set S, such that satisfying S results in Y as the next state; notice this is the inherent purpose of a pState (prospect state). This knowledge allows the multi-FSM DFS function to be modified to use pStates when generating an instruction sequence, resulting in the updated pseudocode illustrated in FIG. 30, which is easier to understand and works well with the definition and implementation of a pState.

In line 4 of FIG. 30, a set of constraints (target state) is converted into a pState. This pState has a defined set of target events, and needs to have the control requirements that trigger these events be identified and solved. Line 4 solves this pState as discussed in previous sections, and stores all possible solutions into the set P. We only need to use one solution in P, therefore the FOR loop starting at line 5 continues to iterate until a solution is found or all entries in P have been explored. To explore the previous time frame, the control requirements from the current pState t are passed as the constraints to the next recursive call to the multi-FSM DFS function. Once the reset state is reached (lines 2 and 3 of FIG. 30), the recursive multi-FSM DFS function reports the input sequence in chronological order in (lines 8 and 9 of FIG. 30) as it returns.

2.6. Real-Time Circuit Profiling

The previously-described techniques can provide an effective ATVG system that is capable of exposing complex circuit design errors. However, such methods, when used alone, may be burdened by the analysis of irrelevant HDL code segments, and by the traversal of already-explored architectural states.

In one embodiment of the present invention, MVP's runtime performance is improved by implanting mechanisms that enable it to learn important details of the circuit under verification as a way to avoid irrelevant circuit scenarios. These mechanisms can exist as a pre-processor that gathers circuit information prior to the circuit verification process, or can also exist as run-time entities that allow MVP to learn from its experience. The following sections describe various learning strategies that may be utilized by the pre-processor as well as at run-time, along with their contributions. These circuit analysis tools allow MVP to learn how to prune the search space as it verifies a hardware description, and impact MVP's memory requirements as it continues to learn.

2.6.1. Pre-Processor Circuit Profiling

A pre-processor to MVP's circuit verification process typically is a lightweight task that provides MVP with valuable insight capable of directing its ATVG process towards a solution. It is because of this low-overhead demand that the pre-processor should not attempt to solve actual constraints, but rather solve early the sub-problems that provide MVP with the most valuable information. Instead of analyzing the implications that the circuit has onto each statement in the hardware description as is done in the real-time circuit analysis process (shown in FIG. 31A), the light-weight circuit profiler for the pre-processor can instead analyze the implications each statement has onto the overall circuit (as shown in FIG. 31B).

2.6.1.1. Assignment Statement Profiling

Many assignment statements in a hardware description simply transfer a constant value onto an identifier. This is particularly true for enumeration data types, as they are commonly used to explicitly control an FSM. Previous sections discussed how a constraint can be solved by exploring all relevant assignment statements that can satisfy its unresolved data implications. Doing this involves instantiating a pState for each constraint for every prospect code path (assignment statement) that resolves it, instantiating the assignment statement and control requirements for each pState in the form of a CDG, inserting this CDG into the pState, and re-solving these pStates to reduce the CDG and to remove all pStates that cannot exist in the hardware description.

Therefore, whenever attempting to satisfy a constraint (especially when it is dependent on an enumeration data type), this solver process will be repeated for a great deal of assignment statements that cannot help satisfy the constraint. Much of this dead-end work can be prevented by taking advantage of the previously-described statementList data structure to index each assignment statement with the identifier value implications that it has onto the hardware description.

This indexing process can be easily and efficiently performed by using MVP's available resources. Satisfying a constraint involves MVP first converting the assignment statement being considered into a CDG and then solving the CDG (as described in previous sections). Solving this CDG provides every identifier within every conjunction with the explicit range in values that satisfies this assignment statement only. Therefore to profile this specific assignment statement, the data implications it imposes onto the circuit are extracted directly from the identifiers within the solved CDG.

2.6.1.2. Implicit Memory Profiling

For complete circuit analysis, MVP typically needs to explore all signals in the hardware description in search for implicit memory elements. In certain cases, MVP may have to postpone resolving a specific constraint until later in the ATVG process; this can only be done if MVP has knowledge of which signals can retain their value across time frames, and how it can be done. MVP identifies these implicit memory elements by negating the explicit guards to all assignment statements onto the signal being analyzed, and inserting them into a single conjunction (unified by Boolean AND operators). This process exploits MVP's efficient CDG solver, and a CDG that does not evaluate to false signifies an implicit memory element. This process therefore takes all implicit memory elements, and defines them explicitly by creating an entry for a corresponding memory-preserving assignment statement within the statementList data structure where the solved CDG denotes the memory-preserving condition.

2.6.1.3. Basic-Block Guard Profiling

When a data contradiction is encountered when solving a constraint, the contradiction typically arises from the union of the guards in the multiple prospect code paths. That is, the guards gathered from satisfying the constraint of a current unresolved identifier will more than likely conflict with the guard of a previously resolved identifier in the constraint. Experiencing an identifier value contradiction within the guard of a basic block is significantly more costly than experiencing a contradiction within the statement itself because the aggregated guards leading up to a basic block is larger in most cases than any of the assignment statements in that basic block, and this guard is repeatedly utilized by all statements within the basic block. Therefore the performance of this guard profiling pre-processor is typically slower than that of the assignment statement profiling pre-processor, but the runtime performance advantage it provides can be equally as significant.

It is possible to take advantage of the statementList data structure once again to hold pre-solved identifier values from the guards to every basic block. Having a pre-solved CDG for a statement's guard facilitates identifying the statements in the hardware description that obviously cannot satisfy a specific constraint. Also, performing this pre-processor step that evaluates the guard information to every basic block allows MVP to identify all statements in the RTL code that obviously cannot be reached by identifying the guards that evaluate to false.

This process of indexing all leaf statementList nodes with the solved identifier values to its guards can be performed as a pre-processor or at run-time. Given that MVP already analyzes all identifiers to expose implicit memory elements, which involves evaluating the guards to all statements, it can implement this basic block guard profiler as a part of the pre-processor. For any given statementList node, MVP can obtain the guard information that allows that entry to be reached by appending its guard to those of all its ancestor nodes. MVP can take advantage of the fact that the guards are distributed throughout the statementList tree (FIG. 20) by gathering the list of solved identifier values at each node, and recursively providing a copy of this list to all its children so they may append onto it.

This recursive process to obtaining guard information includes two important advantages. The data-sharing nature of this recursive process allows it, as a pre-processor that starts at the root statementList node, to reduce the amount of redundant work that would be performed if it were to be executed at run-time starting at a leaf node. In other words, a value contradiction encountered within the guard of a non-leaf statementList node will nullify all statements residing as its children. The second advantage is that it can identify all unreachable basic blocks within the hardware description without having to analyze all basic blocks. As shown in FIG. 32, an identifier value contradiction exposed within the guard of an internal statementList node will automatically denote all the statements in its sub-tree as unreachable as well.

Unreachable blocks commonly exist within CASE statements. It is human nature to be cautious, and that encourages engineers at times to create a CASE statement with a "when others" clause that assigns default values to all control signals even though all possible cases have been handled explicitly. Because all explicit cases are implemented, the "when others" clause will never be executed. MVP attempts to satisfy a constraint by starting at all relevant assignment statements, even if such an assignment statement exists within an unreachable basic block of the hardware description. Analyzing these unreachable statements is futile because their guards evaluate to 'false'.

As discussed previously, a worst scenario for generating a CDG can occur when analyzing the "when others" clause of a large CASE statement, because its guard is the conjunction of all negated guards to all explicit cases. Therefore, if all unreachable basic blocks are allowed to be re-analyzed, MVP's runtime performance could be degraded by the overhead of creating a pState of the constraint being solved, converting the large guards to these "when other" clauses into a CDG, and performing the costly restructure and solve process to this CDG that evaluates to 'false'. It is therefore important that all unreachable code statements be flagged and ignored.

2.6.2. Runtime Circuit Profiling

In one embodiment of the present invention, MVP's runtime circuit verification process is a complete task focused on exploring uncharted territory within the processor. In an ideal problem, it would be possible to travel throughout a hardware description's architectural state space without retracing one's steps. Unfortunately, 100% finite state machine (FSM) coverage commonly involves a significant amount of redundant state exploration. Therefore as MVP gets further into its verification process, it is forced to retrace more of the previously explored state space in order to reach the target architectural state that defines the ATVG goal. Also, there are many architectural states that have a high occurrence frequency as they are a precursor to a wide range of other architectural states. Thus, retaining some of their pre-solved information can optimize MVP's performance in the long run. This section focuses on the run-time circuit profiling efforts that can allow MVP to breeze through the already-explored state space when attempting to satisfy a unique ATVG goal.

2.6.2.1. FSM Profiling

The previous section discusses practical pre-processor methods for gathering circuit information that can prevent MVP from analyzing irrelevant circuit scenarios, and can speed up its analysis of previously explored assignment statements through pre-generated circuit information. Its scope lies within the realm of a single time frame of the ATVG effort with its microscopic focus of optimizing the analysis of individual statements. Another type of profiling has equivalent objectives, but has a scope across multiple time frames with a macroscopic focus of optimizing the analysis of the implicit finite state machine.

The previous section introduced the theory behind a finite state machine described by $y=\delta(s, x)$, where a target state y can be reached from state s when the FSM's inputs are x. When the target state y can be reached by multiple states $s_1 \ldots s_n$, we can use a weight scheme such that the state s with the lowest weight provides MVP with two advantages:

i. When the pStates have never been explored (thus they are un-indexed), it will allow MVP to choose the state s with the least number of constraints that will need to be satisfied at the subsequent ATVG iteration. If the reset state is among the set, it will be characterized by the lack of constraints that need a subsequent ATVG iteration, therefore resulting in a weight of zero.

ii. When any of the pStates has been previously explored, its weight will be lower than all unexplored pStates, and will provide MVP with guidance towards the reset state as all subsequent pStates will continue to have lower weights.

Implementing this weight-assigning process involves modifying the multi-FSM DFS function of FIG. 26 as depicted in FIG. 33. Line 5 now selects the optimal candidate for the next ATVG iteration by selecting the pState with the lowest weight. If the selected pState has a weight of zero, the previous recursive call to the multi-FSM DFS function has its length value l updated to zero on line 7, and it is returned SUCCESS signifying that the reset state has been reached on line 8. The previous recursive call to the multi-FSM DFS function will then be in charge of updating the weight values on line 10, incrementing the weight for its previous recursive call on line 11, and then commencing as usual.

One goal of exploring a finite state machine, as mentioned previously, is to generate an input sequence that maps the hardware description's architectural state from its reset state onto any architectural state that satisfies the given set of constraints. This process begins at the target architectural state, and continues to traverse the circuit backwards in time until the reset state is reached. A hardware description is characterized by the inter-dependent FSMs from all of its internal registers, and developing a macroscopic understanding on the overall FSM will involves understanding all possible state combinations (the cross product) from all these smaller inter-dependent FSMs. We can therefore simplify the FSM profiling task by placing our focus at the individual FSMs for each register as they make up the building blocks for the overall FSM. Actually, MVP does not need to make a distinction between internal signals and internal registers during runtime FSM profiling because the implementation described below is broad enough to not require such an explicit distinction.

One objective in performing FSM profiling on the overall circuit is to achieve the profiling tasks on the individual FSMs, and employ a mechanism that translates this low-level FSM profiling information into a circuit-wide FSM profiler. This concept may be tricky, some embodiments of MVP do not manage these FSMs explicitly. Some embodiments of MVP can include the mechanisms that allow it to build and analyze these interacting FSMs explicitly, but that might involve performing another level of computations that should not be necessary. Note that MVP's strength is in its ability to analyze the circuit under verification by focusing on the source code, and it is possible to exploit MVP's source code database of the circuit under verification to achieve similar circuit profiling results.

The low-level circuit analysis is meant to account for the many inter-dependent FSMs, and so it therefore analyzes the FSM associated with each identifier that may (or may not) represent an internal register. One embodiment of MVP uses a construct entitled as an identifierSet, whose purpose it is to keep track of every location that each identifier is assigned a value onto. One objective of this construct is to optimize generating all possible pStates from a given identifier constraint by having the sources to all possible solutions be readily available in one set. Therefore, MVP can use all entries corresponding to a constraint's identifier to provide the needed FSM profiling information. We can exploit the fact that MVP accesses this identifierSet data structure each time it attempts to use a code path as a solution by also having MVP leave behind real-time low-level circuit profiling information whenever it successfully utilizes this data source to satisfy a constraint.

The aforementioned global FSM profiling effort interprets the low-level FSM profiling information and identifies the shortest FSM path that can reach the circuit's reset state. Typically the low-level profiling effort is performed when MVP attempts to use a line of HDL source code for satisfying a circuit constraint. Therefore, it can be beneficial to identify which MVP construct is analyzing these lines of code and could stand to benefit from the low-level profiling efforts. Looking at FIG. 29, we can see that the resulting input sequence is generated by instantiating pStates as the mechanisms that carry the potential solutions as they are being developed, and thus the pState construct should be used to manage the global FSM profiling effort.

In one embodiment of the present invention, the low-level FSM profiling effort is focused on depositing information onto each statement in the hardware description to record its scope and the success it can provide. Conversely, the global FSM profiling effort is focused on unifying the information gathered from all statement sources that represent a given solution as a way to avoid costly or irrelevant scenarios.

FSM Weight Indexing

MVP's ATVG process can independently find the reset state through exploration of an FSM, but this alone may involve much backtracking. We can therefore exploit its ability to find and detect the reset state by appending the explored states in each FSM (the explored assignment statements for the identifier behind the FSM's register) with a weight value equal to its distance from the reset state. If MVP is instructed to generate an input sequence with a length of at most l, then we can assign each state an initial weight>l.

However, the task of assigning weight values to a processor's architectural states may not be so straight forward. This is because each pState is influenced by multiple implicit FSMs, and can be pieced together by several concurrent assignment statements that successfully satisfy all simultaneous constraints. MVP, therefore, may not assigning weight values to explicit architectural states, but rather assign weights to the assignment statements that were used to piece them together.

MVP can perform its run-time weight-assigning process following every ATVG iteration to update each assignment statement's resulting distance to its FSM's reset state. Any given assignment statement may impact several distinct architectural states, and thus its weight value may have multiple sources. For the sake of allowing MVP to move towards an optimal solution while keeping the ATVG implementation simple, we can allow each assignment statement to store the lowest weight value it is assigned. Using a given assignment statement's lowest assigned weight value, say w, can be reasonable, because that statement has the potential of providing an instruction sequence of size w again in the future. Therefore, giving preference to this statement over other alternate assignment statements of higher weight allows MVP to choose the ATVG path with the highest probability of producing the shortest path to the reset state.

pState Weight Estimation

MVP's ATVG process presents it with multiple pStates at every time frame, from which it chooses one pState with which to attempt and reach the reset state. Therefore, providing MVP with a weighing scheme for its pStates can help it easily identify the most effective solution path. The motivation for extracting a weight value from a pState is twofold, as mentioned at the start of this section. In choosing the ideal pState, MVP can first favor those solutions to which a path to the reset state has already been identified; otherwise it can favor the pStates with the least number of constraints to justify. These two objectives can be handled inherently by a single weighing scheme.

Finding a balance between these two objectives can involve trade-offs, since the first objective typically involves solving the pState to extract an accurate weight from the utilized statements, and the second requires the pState to not have been solved. Using our FSM weight indexing scheme where we index each RTL assignment statement with its known distance to the reset state, we can attain a weight value to a solved pState because it will then have assignment statements associated to it that were used to satisfy its constraints. Thus for the first case, if a pState has not been solved, then it will not have these assignment statements that are necessary to estimate its distance to the reset state. Conversely for the second case, the number of constraints to resolve in a pState obviously can only be evaluated before these constraints are resolved.

In one embodiment of the present invention, identifying a pState's weight involves MVP using a unifying scheme that satisfies both of the preceding objectives. MVP first solves the pState, and then adapts its weight-assigning scheme to handle the second case which favors the pState with the least number of ATVG constraints. It can do this adaptation by counting the number of constraints that will propagate into the following ATVG iteration. Estimating the weight that gives preference to those previously-solved pStates closest to the reset state can involve multiplying the number of constraints that need to be resolved in the next ATVG iteration by the average weight of the assignment statements associated to the solved constraints. A pState whose constraints were solved in a previous ATVG problem will have assignment statements associated to it whose weight is lower than the maximum weight, and thus its average weight will naturally be lower than the maximum weight.

Modified ATVG Technique

MVP's pState-weighing scheme involves modifying MVP's ATVG function as depicted in FIG. 34. The get_previous_timeFrame( ) function extracts, from a pState y, all the pStates s that can transition into y. It requires y to have been solved (have all its constraints satisfied), and it returns a set of pStates s that are have not been solved. Thus, the objective of this modification is to ensure that the multi-FSM DFS( ) function calls the weight estimation procedure on solved pStates only, as well as perform weight indexing using solved pStates only.

One change that allows us to satisfy our objective is that the function now expects the alternate ATVG objectives Y to be a previously solved set of pStates. Having Y be a solved set of pStates allows MVP to immediately use its weight estimation methods for identifying the ATVG goal in Y that is estimated to be closest to the circuit's reset state. Afterwards, this modification converts the chosen path in Y into the alternate sets of constraints P that define the preceding architectural states. If the pState set in P includes the reset state, then the ATVG iteration is complete. Otherwise the set in P is solved to define the set of previous time frames S that can transition into Y, and to define the inputs that allow this transition to take place. The preceding pStates in S are themselves justified towards the reset state by invoking a recursive call to the multi-FSM DFS( ) function.

2.6.2.2. Explored State-Space Tracking

The ATVG function in FIG. 34 will typically receive, from line 3, pStates that have been traversed by a previous recursive call within the same ATVG iteration. When this happens, those pStates should be ignored, because re-analyzing them will not help the ATVG function get any closer towards a solution. Ignoring the visited pStates is both an up-stream and down-stream process. Preventing the ATVG function from revisiting a pState that is visited earlier in the same input sequence will prevent the ATVG function from analyzing FSM loops. Furthermore, preventing the ATVG function from revisiting a pState that was visited by a previous input sequence branch that failed to generate a result will prevent the ATVG function from analyzing unsuccessful paths more than once.

These changes to the multi-FSM DFS function are illustrated in FIG. 35. The multi-FSM DFS function now has an extra input, VS, that specifies the set of pStates that have been visited by that ATVG iteration. Line 5 now checks if the current pState to be analyzed, t, has been previously visited by that same ATVG iteration. If it has been previously visited, then line 6 deletes it and allows the subsequent iteration of the FOR loop on line 4 to analyze the next pState in the solution set P. If it has not been previously visited, then line 7 allows the multi-FSM DFS function to store p' into the visited set VS and proceed as usual.

MVP can identify if a pState p' has been previously visited by identifying if p' is masked by the set of visited pStates in VS. A pState is defined by a set of register and input identifiers, and their corresponding range in values. For the purpose of obtaining a clear perspective on when one pState masks another, one needs to realize that an identifier missing from a pState signifies that the corresponding identifier has a complete range in values. In terms of identifiers, an identifier with a range in values v is masked by a corresponding identifier instantiation with a range in values v' if and only if (IFF) the range in values for v are encapsulated by the range in values for v' ($v \in v'$). We can therefore identify if a pState t' is masked by a pState t IFF the set of identifiers referenced by pState t is a subset of the identifiers referenced by t', and IFF the range in values of the identifiers in t encapsulate the range in values of the corresponding identifiers in t'.

2.6.3. Memory Requirements for Circuit Profiling

Note that the pre-generated circuit information does not suffer from the state explosion problem because it is kept in its basic form with respect to the basic blocks of the implementation per HDL process. It is not kept as the permutations and combinations between all processes that make up a circuit's state-space. As a result, the memory requirements for MVP's learning strategy increase linearly with respect to an implementation's code size.

2.6.4. Optimization Results from Runtime Circuit Profiling

Each of MVP's ATVG iterations generates an input sequence that maps any target architectural state to the reset state during justification ATVG, and generates an input sequence that propagates a discrepancy in values during propagation ATVG. Propagation ATVG is typically not as difficult of a problem as justification ATVG, because it is more dependent on a circuit's data path than it is on its complex FSM. Furthermore, if a path to the reset state has not been identified, the justification search process is blind.

MVP's pState weighing scheme helps it to forecast the easiest path to the circuit's reset state by selecting the pState with the least number of simultaneous constraints (as described for pState weight estimation). This weight estimation scheme can dramatically improve the run time.

Figure 36:
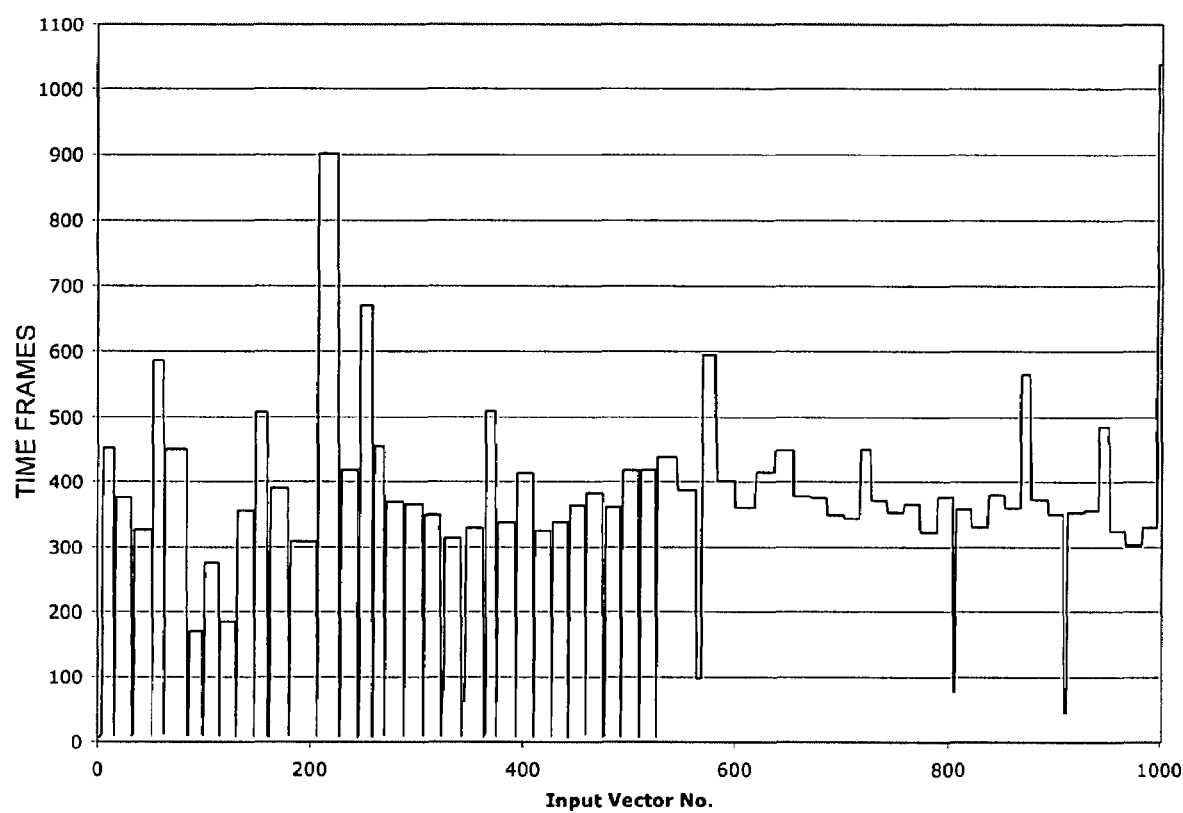
FIG. 36 illustrates an ATVG search space after pState weight estimation in accordance with an embodiment of the present invention.

FIG. 36 illustrates an ATVG search space for an exemplary design after pState weight estimation. The width of each bar specifies the number of vectors within a specific input sequence and the height specifies the number of FSM time frames that had to be analyzed in order to reach a solution. The thicker bars correspond to a justification input sequence while the thin and short bars that appear as indentations correspond to each propagation input sequence. This graph illustrates how it is typically much easier to perform propagation ATVG than it is to perform justification ATVG; however, the lack of thin and short bars on the right half of the graph also shows us how later ATVG problems are plagued by mutants that are difficult to propagate towards an observation point.

Figure 37:
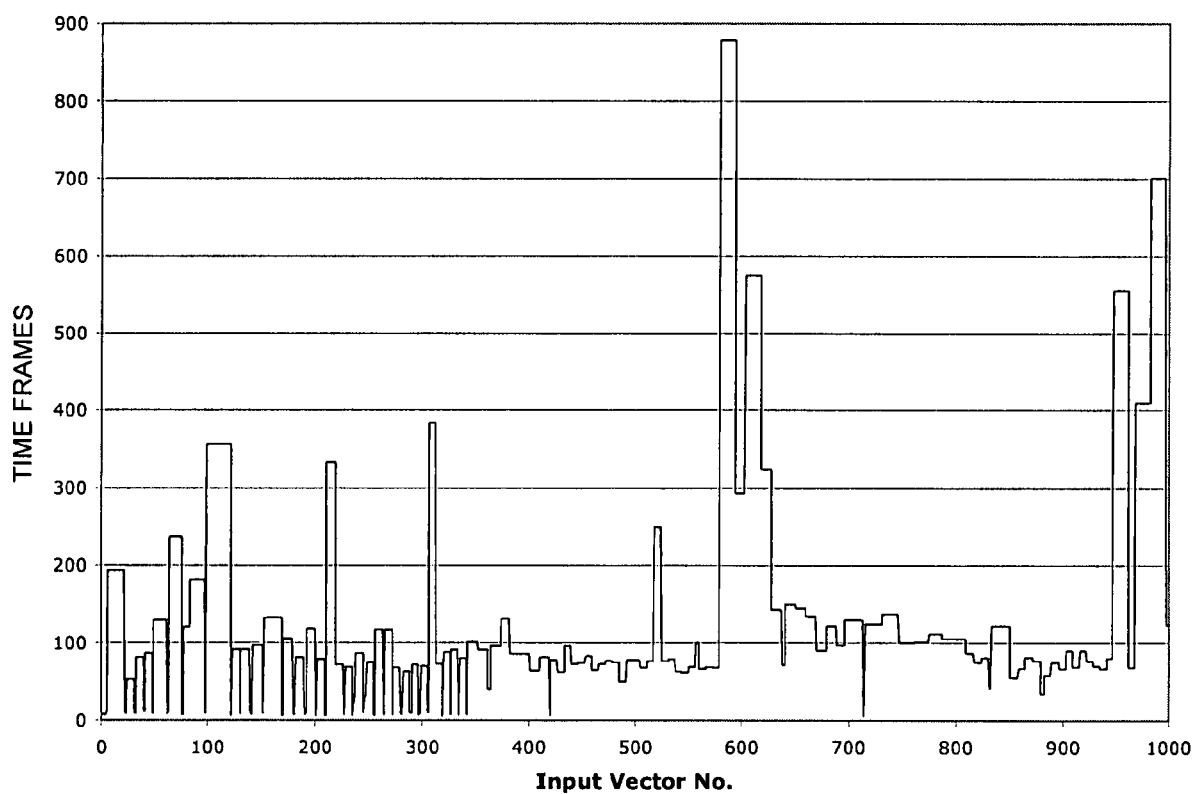
FIG. 37 illustrates an ATVG search space after pState weight estimating and weight indexing in accordance with an embodiment of the present invention.

Another benefit of the pState weight indexing framework described is that it allows MVP to somewhat keep track of the shortest path to the reset state (as described for FSM weight indexing). Comparing the number of time frames analyzed per ATVG iteration between FIG. 36 (which illustrates the result of pState weight estimation) and FIG. 37 (which illustrates the results of both pState weight estimation and FSM weight indexing) shows that reaching the reset state can be highly optimized by using FSM weight indexing. FIG. 37 illustrates how the number of time frames in the typical FSM search space was dramatically reduced. There are still occasional justification problems that are difficult to solve, as shown by the large bars around vectors 600 and 1000, but they don't dominate the problem space and their solutions contribute to MVP's FSM learning process.

2.7. Runtime Comparisons

Figure 38:
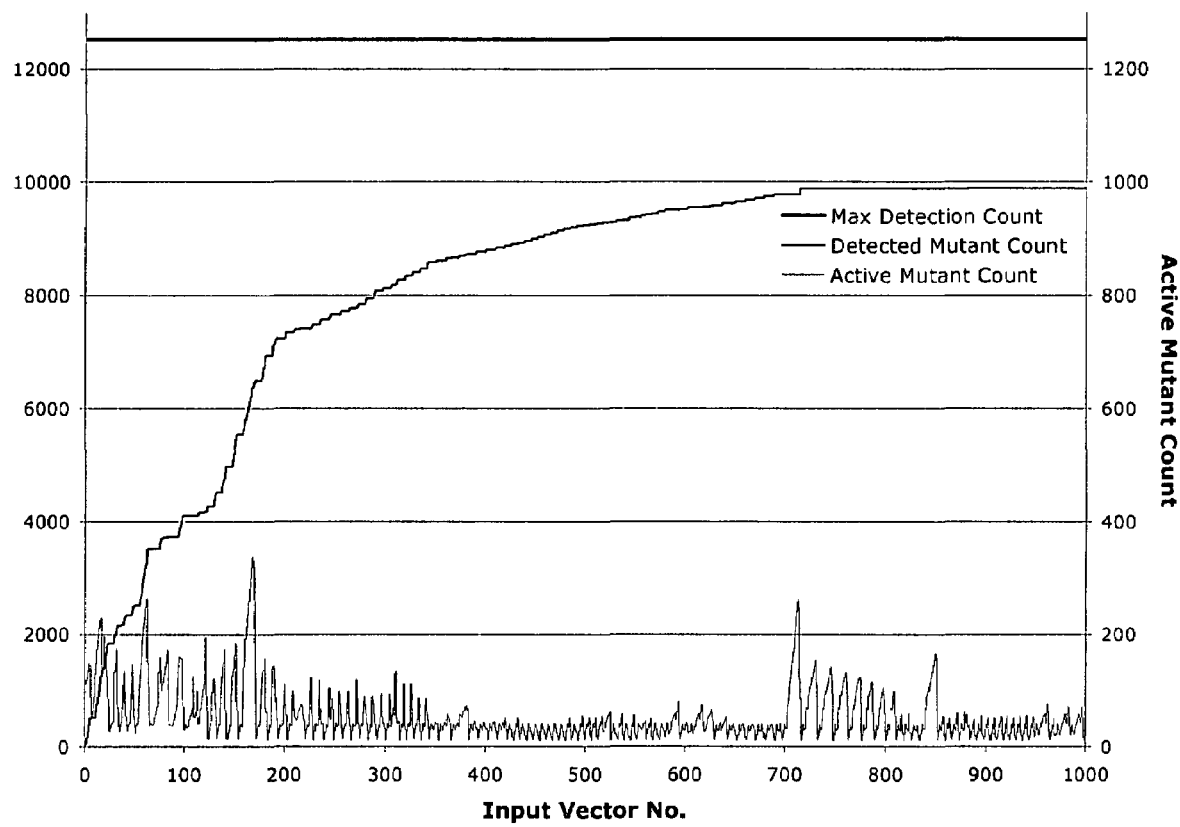
FIG. 38 illustrates a comparison (for a sample design) between MVP's approach and the random methods typically used to expose design errors in accordance with an embodiment of the present invention.

FIG. 38 illustrates a comparison (for a sample design) of MVP's approach to the random methods typically used to expose circuit design errors, and demonstrates MVP's effectiveness in continuously traversing the unexplored portions of a circuit's architectural state-space. More specifically, FIG. 38 illustrates MVP's effectiveness at stimulating mutant peaks, resulting in a continuous mutant detection rate.

Consider the simulation results after input vector 700. After this point, MVP has already stimulated every mutant by activating (or removing) it and is now making a second pass to attempt in exposing mutants in the remaining dominant partitions. The ATVG methods perform justification (to activate mutants) and propagation (to expose mutants at an observation point) ATVG as two separate steps such that mutant propagation always follows mutant activation. As is shown in FIG. 38, this segregated approach typically works well for the vast majority of mutants that are easy to propagate. However, there may be a special class of mutants that require special values in the data registers as a precondition to propagation that cannot be predicted by the justification ATVG algorithm. It is this class of mutants that reside between MVP's maximum detected mutant count (~10,000 mutants) and the absolute maximum of detectable mutants (12,527 mutants) for the sample design.

Note that one embodiment of the present invention can involve joining the justification and propagation ATVG phases into a single ATVG algorithm that guarantees a specific mutant is activated and propagated to an observation point as a means to produce the absolute optimal input sequence for circuit verification. This technique will affect the FSM search space (shown in FIG. 37) by allowing more propagation ATVG iterations to complete successfully at later time frames, therefore allowing the short and narrow bars to appear throughout FIG. 37 and not just the first half.

3. Summary

A common characteristic for random and pseudo-random ATVG is their tendency to provide new circuit coverage in bursts. These sudden bursts of productivity in the verification phase of a circuit design project are a common phenomenon that plagues the circuit design industry. It is common that circuit design teams become convinced that their design is close to being fabrication-ready because subsequent verification iterations continue to expose less critical bugs, only to have a later verification iteration expose a large dose of previously undetected critical bugs. If this large dose of critical bugs could have been stimulated and catalogued at some earlier verification iteration, it could have been fixed earlier and required less time-consuming verification iterations.

Given that a hardware description is constantly changing during the circuit development process, a circuit implementation becomes a moving target for circuit verification. Therefore, the most complicated aspects to circuit verification are the problems in identifying where one needs to perform circuit verification, and in identifying how much circuit verification is enough.

In one embodiment of the present invention, a verification system provides a complete circuit verification system for exposing complex design errors in modern hardware descriptions. This system utilizes circuit analysis techniques to automatically generate a complete collection of mutants around a set of control points to implement a control-based coverage metric. A mutation-based circuit simulator allows the system to monitor and manage all mutants simultaneously. These abilities enable the system to automate the tasks of identifying and monitoring all the circuit locations that need to be verified for correctness at every point in the verification process.

The system's circuit analysis abilities also enable generating deterministic input vectors that are focused at stimulating an unexplored portion of the circuit. The system utilizes a mutant database to identify the circuit scenario that has the highest probability of containing a design flaw, and automatically generates an input sequence that targets such a circuit scenario. These input vectors produce a coverage pattern that is more consistent and predictable than random input vectors, thereby allowing an engineer to understand exactly when enough circuit verification has been performed. This system can enable a verification engineer to make a calculated decision on when to terminate the verification process based on whether mutant detection trends have either reached above a given coverage level or the detection trend has reached a horizontal asymptote. To achieve this, the system implements a closed-loop verification strategy, where the coverage analysis provided by circuit simulation influences the focus for its deterministic automated test vector generation (ATVG) efforts, and the resulting input sequence from deterministic ATVG is fed back into its mutation-based circuit simulator before the next optimal ATVG goals are defined.

The described system automates the circuit verification process so that circuit design engineers can focus their energy and creativity on the circuit design effort itself, and not on circuit verification. The system has the ability to automate every step in a circuit verification paradigm, by: starting with defining and instantiating any coverage metric for any given hardware description; automatically tracking the unstimulated portions of the circuit implementation at every stage of the circuit design and circuit verification efforts; automatically generating deterministic input stimuli that guarantee coverage of previously-unexplored portions of the circuit implementation.

Note that the system described in the present invention overcomes limitations in other verification approaches. For instance, the system described does not rely on a gate-level implementation that has been previously synthesized from an HDL description. The system also does not need significant human foresight in building test templates that describe architecture-level characteristics that need to be tested, and running such templates through a model-based test vector generator. Similarly, the system does not need verification engineers to develop diverse sets of program macros, unlike other verification systems that attempt to combine such macros in various sequences using a genetic technique to attempt to generate tests every corner of the design. Note also that the described system does not modify the original implementation, and hence does not generate a collection of multiple implementations that require independent simulations.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A computer-implemented method for automatically generating a deterministic input sequence for a circuit design using mutant-based verification, comprising:

electronically receiving a description of the circuit design;

electronically determining, using a computer, a target value for a control signal in the description;

electronically determining a mutant value for the control signal;

electronically determining if an input sequence for the circuit design exists that stimulates the control signal to the target value and causes the effects of the target value and the effects of the mutant value to reach an observation point in the circuit design such that the effects of the target value and the effects of the mutant value differ at the observation point, by:

electronically generating a target prospect state which represents an activated state of the circuit design that satisfies the target value for the control signal, wherein a prospect state which represents a state of the circuit design includes a first constraint-dependency graph that defines a set of constraints to be satisfied simultaneously and includes a second constraint-dependency graph that defines the set of conditional values that allow the set of constraints to be satisfied simultaneously; and electronically determining an input sequence by electronically analyzing a set of prospect states to find a first path of prospect states from the activated state to a reset state of the circuit design and to find a second path of prospect states from the activated state to the observation point;

if so, electronically simulating operation of the circuit design using the input sequence; and during simulation, electronically generating a first set of signal values affected by the target value for the control signal and a second set of signal values affected by the mutant value for the control signal.

2. The computer-implemented method of claim 1, wherein the mutant value is an erroneous value for the control signal that is injected into the circuit design to replace the target value of the control signal.

3. The computer-implemented method of claim 1, wherein the description is a high-level description of the circuit design specified using a hardware description language.

4. The computer-implemented method of claim 1, wherein electronically determining if an input sequence for the circuit design exists involves:

electronically identifying a set of constraints that result in the control signal being set to the target value, wherein the set of constraints define the activated state for the control signal and wherein a mutant construct is used to define a set of activation constraints for the control signal as well as the mutant value for the control signal;

electronically determining a first input sequence for the circuit design from the first path of prospect states, that achieves the activated state and causes the mutant value to be injected; and electronically determining a second input sequence for the circuit design, from the second path of prospect states, that propagates the first set of signal values and the second set of signal values to the observation point from the activated state.

5. The computer-implemented method of claim 1, wherein electronically generating two sets of signal values involves:

electronically generating the first set of signal values using the input sequence and the target value; and electronically generating the second set of signal values using the input sequence, the target value, and the mutant value;

wherein electronically generating the second set of signal values involves electronically detecting when, during simulation, the control signal reaches the target value, and then electronically changing the value of the control signal to the mutant value.

6. The computer-implemented method of claim 5, wherein a mutant simulator electronically generates the first and second set of signal values simultaneously;

wherein during simulation the mutant simulator electronically generates the first and second set of simulation values by simultaneously tracking multiple values for signals in the circuit design; and wherein electronically generating two or more sets of signal values simultaneously reduces simulation overhead for the circuit design.

7. The computer-implemented method of claim 1, wherein the computer-implemented method is applied to the control signals of the circuit design to deterministically generate input sequences that provide control-based coverage of the circuit design; and wherein providing control-based coverage of the circuit design detects errors in the circuit design and helps the user to verify the correct operation of the circuit design.

8. The computer-implemented method of claim 7, wherein applying the method to the control signals of the circuit design involves:

electronically analyzing the description of the circuit design to find the control signals in the circuit design;

electronically building a database of mutant constructs based on the target values and mutant values for the control signals; and using the database while electronically generating a set of input sequences that stimulate the control signals.

9. The computer-implemented method of claim 8, wherein the database facilitates electronically clustering the mutant values to determine target areas in the circuit design with a higher density of control signals;

wherein electronically generating the set of input sequences involves using the database to electronically ensure that all of the mutant values have been stimulated;

wherein the database is partitioned to facilitate continuously locating the largest remaining related set of unstimulated control signal values.

10. The computer-implemented method of claim 9, wherein multiple mutant values associated with a given control signal are electronically stimulated simultaneously using the same input sequence.

11. The computer-implemented method of claim 10, wherein multiple mutant values being simultaneously stimulated using the same input sequence are associated with different control signals in the circuit design.

12. The computer-implemented method of claim 1, wherein a constraint-dependency graph is used to electronically solve a system of equations for statements in the description of the circuit design; and wherein the graph structure of the constraint-dependency graph facilitates electronically appending additional constraints onto the constraint-dependency graph.

13. The computer-implemented method of claim 1, wherein electronically analyzing the set of prospect states involves electronically finding a path that balances trade-offs between a desired length for a potential path and the estimated computational effort involved in finding the potential path.

14. The computer-implemented method of claim 1, wherein the method further involves electronically translating the input sequence into a format that assists user verification and understanding of the circuit design.

15. The computer-implemented method of claim 1, wherein the method further involves:

electronically receiving a user-specified input sequence for the circuit design;

using mutation-based verification to electronically determine the control-coverage provided by the user-specified input sequence.

16. A computer-readable storage medium storing instructions that when executed by a computer cause the computer to perform a method for automatically generating a deterministic input sequence for a circuit design using mutant-based verification, the method comprising:

receiving a description of the circuit design;

determining a target value for a control signal in the description;

determining a mutant value for the control signal;

determining if an input sequence for the circuit design exists that stimulates the control signal to the target value and causes the effects of the target value and the effects of the mutant value to reach an observation point in the circuit design such that the effects of the target value and the effects of the mutant value differ at the observation point, by:

generating a target prospect state which represents an activated state of the circuit design that satisfies the target value for the control signal, wherein a prospect state which represents a state of the circuit design includes a first constraint-dependency graph that defines a set of constraints to be satisfied simultaneously and includes a second constraint-dependency graph that defines the set of conditional values that allow the set of constraints to be satisfied simultaneously; and determining an input sequence by analyzing a set of prospect states to find a first path of prospect states from the activated state to a reset state of the circuit design and to find a second path of prospect states from the activated state to the observation point;

if so, simulating operation of the circuit design using the input sequence; and during simulation, generating a first set of signal values affected by the target value for the control signal and a second set of signal values affected by the mutant value for the control signal.

17. An apparatus for generating a deterministic input sequence for a circuit design using mutant-based verification, comprising:

a receiving mechanism configured to receive a description of the circuit design;

a determining mechanism configured to determine a target value for a control signal in the description;

wherein the determining mechanism is further configured to determine a mutant value for the control signal;

wherein the determining mechanism is further configured to determine if an input sequence for the circuit design exists that first stimulates the control signal to the target value and causes the effects of the target value and the effects of the mutant value to reach an observation point in the circuit design such that the effects of the target value and the effects of the mutant value differ at the observation point, by:

generating a target prospect state which represents an activated state of the circuit design that satisfies the target value for the control signal, wherein a prospect state which represents a state of the circuit design includes a first constraint-dependency graph that defines a set of constraints to be satisfied simultaneously and includes a second constraint-dependency graph that defines the set of conditional values that allow the set of constraints to be satisfied simultaneously; and determining an input sequence by analyzing a set of prospect states to find a first path of prospect states from the activated state to a reset state of the circuit design and to find a second path of prospect states from the activated state to the observation point;

a simulating mechanism that simulates operation of the circuit design using the input sequence if the input sequence exists;

a generating mechanism configured to generate during simulation a first set of signal values affected by the target value for the control signal and a second set of signal values affected by the mutant value for the control signal.

* * * * *